US012518590B2

(12) United States Patent
Acres

(10) Patent No.: US 12,518,590 B2
(45) Date of Patent: Jan. 6, 2026

(54) METHOD FOR CONFIGURING CASINO OPERATIONS

(71) Applicant: Acres Technology, Las Vegas, NV (US)

(72) Inventor: John F. Acres, Las Vegas, NV (US)

(73) Assignee: Acres Technology, Las Vegas, NV (US)

( * ) Notice: Subject to any disclaimer, the term of this patent is extended or adjusted under 35 U.S.C. 154(b) by 0 days.

(21) Appl. No.: 17/865,964

(22) Filed: Jul. 15, 2022

(65) Prior Publication Data

US 2023/0005325 A1 Jan. 5, 2023

Related U.S. Application Data

(60) Continuation of application No. 17/089,069, filed on Nov. 4, 2020, now Pat. No. 11,423,737, which is a (Continued)

(51) Int. Cl.
*G07F 17/32* (2006.01)
*G07F 17/34* (2006.01)

(52) U.S. Cl.
CPC .......... *G07F 17/3223* (2013.01); *G07F 17/32* (2013.01); *G07F 17/3213* (2013.01); (Continued)

(58) Field of Classification Search
CPC ............. G07F 17/3255; G07F 17/3239; G07F 17/3213; G07F 17/34; G07F 17/32; G07F 17/3223; G07F 17/3234; G07F 17/3232
See application file for complete search history.

(56) References Cited

U.S. PATENT DOCUMENTS 2,669,389 A 2/1954 Mesi et al.
3,124,355 A 3/1964 Mentzer et al.
(Continued)

FOREIGN PATENT DOCUMENTS

EP 0141264 5/1985
EP 0896304 2/1999
(Continued)

OTHER PUBLICATIONS

Acres, John, "The Future of Gaming, Where will you be in 10 years?" Slot Operations Management / Casino Enterprise Management, Jul. 2007, pp. 8-10, 12.
(Continued)

*Primary Examiner* — Steve Rowland
(74) *Attorney, Agent, or Firm* — Ballard Spahr LLP

(57) ABSTRACT

Embodiments of the present invention are directed to a method of optimizing at least one performance variable, such as revenue or profitability, indicative of the performance of a casino. An initial set of operating parameters is set. At least one environmental variable, such as traffic, weather, time, cost of transportation, etc. are monitored as is the performance variable. An artificial intelligence program changes operating parameters, such as player-tracking rewards, bonuses, comps, advertising, etc. The program determines the effect of the change, and further changes the operating parameter as a function of the effect and the environmental variable.

20 Claims, 8 Drawing Sheets

Related U.S. Application Data continuation of application No. 16/215,876, filed on Dec. 11, 2018, now Pat. No. 10,846,982, which is a continuation of application No. 15/459,898, filed on Mar. 15, 2017, now Pat. No. 10,192,392, which is a continuation of application No. 14/997,182, filed on Jan. 15, 2016, now Pat. No. 9,633,528, which is a division of application No. 12/272,646, filed on Nov. 17, 2008, now abandoned.

(52) U.S. Cl.
CPC ...... *G07F 17/3232* (2013.01); *G07F 17/3234* (2013.01); *G07F 17/3239* (2013.01); *G07F 17/3255* (2013.01); *G07F 17/34* (2013.01)

(56) References Cited

U.S. PATENT DOCUMENTS

| | | | |
|---|---|---|---|
| 3,124,674 | A | 3/1964 | Edward et al. |
| 3,684,290 | A | 8/1972 | Wayne |
| 3,727,213 | A | 4/1973 | Kurtenbach |
| 3,751,040 | A | 8/1973 | Carey |
| 4,240,635 | A | 12/1980 | Brown |
| 4,254,404 | A | 3/1981 | White |
| 4,433,844 | A | 2/1984 | Hooker et al. |
| 4,624,459 | A | 11/1986 | Kaufman |
| 4,657,256 | A | 4/1987 | Okada |
| 4,836,546 | A | 6/1989 | DiRe et al. |
| 4,887,813 | A | 12/1989 | Chiles, III et al. |
| 5,022,653 | A | 6/1991 | Suttle et al. |
| 5,024,439 | A | 6/1991 | Okada |
| 5,027,102 | A | 6/1991 | Sweeny |
| 5,031,914 | A | 7/1991 | Rosenthal |
| 5,078,405 | A | 1/1992 | Jones et al. |
| 5,152,529 | A | 10/1992 | Okada |
| 5,178,395 | A | 1/1993 | Lovell |
| 5,221,083 | A | 6/1993 | Dote |
| 5,265,880 | A | 11/1993 | Maksymec |
| 5,342,049 | A | 8/1994 | Wichinsky et al. |
| 5,364,104 | A | 11/1994 | Jones et al. |
| 5,377,973 | A | 1/1995 | Jones et al. |
| 5,380,008 | A | 1/1995 | Mathis et al. |
| 5,490,670 | A | 2/1996 | Hobert |
| 5,536,016 | A | 7/1996 | Thompson |
| 5,564,700 | A | 10/1996 | Celona |
| 5,584,485 | A | 12/1996 | Jones et al. |
| 5,586,766 | A | 12/1996 | Forte et al. |
| 5,655,961 | A | 8/1997 | Acres et al. |
| 5,674,128 | A | 10/1997 | Holch et al. |
| 5,695,402 | A | 12/1997 | Stupak |
| 5,697,844 | A | 12/1997 | Kohorn |
| 5,743,798 | A | 4/1998 | Adams et al. |
| 5,758,875 | A | 6/1998 | Giacolone, Jr. |
| 5,766,076 | A | 6/1998 | Pease et al. |
| 5,816,918 | A | 10/1998 | Kelly et al. |
| 5,830,064 | A | 11/1998 | Bradish et al. |
| 5,836,816 | A | 11/1998 | Bruin et al. |
| 5,836,817 | A | 11/1998 | Acres et al. |
| 5,851,147 | A | 12/1998 | Stupak et al. |
| 5,910,048 | A | 6/1999 | Feinberg |
| 5,913,726 | A | 6/1999 | Jones et al. |
| 5,934,998 | A | 8/1999 | Forte et al. |
| 5,941,770 | A | 8/1999 | Miers et al. |
| 5,960,406 | A | 9/1999 | Rasansky et al. |
| 5,984,779 | A | 11/1999 | Bridgeman et al. |
| 6,003,013 | A | 12/1999 | Boushy et al. |
| 6,012,983 | A | 1/2000 | Walker et al. |
| 6,024,642 | A | 2/2000 | Stupak |
| 6,030,109 | A | 2/2000 | Lobsenz |
| 6,032,955 | A | 3/2000 | Luciano et al. |
| 6,045,130 | A | 4/2000 | Jones et al. |
| 6,048,272 | A | 4/2000 | Tsujita |
| 6,059,659 | A | 5/2000 | Busch et al. |
| 6,077,163 | A | 6/2000 | Walker et al. |
| 6,086,477 | A | 7/2000 | Walker et al. |
| 6,106,395 | A | 8/2000 | Begis |
| 6,110,041 | A | 8/2000 | Walker et al. |
| 6,110,043 | A | 8/2000 | Olsen |
| 6,135,884 | A | 10/2000 | Hedrick et al. |
| 6,146,273 | A | 11/2000 | Olsen |
| 6,165,071 | A | 12/2000 | Weiss |
| 6,168,521 | B1 | 1/2001 | Luciano et al. |
| 6,183,362 | B1 | 2/2001 | Boushy |
| 6,186,892 | B1 | 2/2001 | Frank et al. |
| 6,186,893 | B1 | 2/2001 | Walker et al. |
| 6,196,918 | B1 | 3/2001 | Miers et al. |
| 6,210,276 | B1 | 4/2001 | Mullins |
| 6,217,448 | B1 | 4/2001 | Olsen |
| 6,224,482 | B1 | 5/2001 | Bennett |
| 6,234,900 | B1 | 5/2001 | Cumbers |
| 6,254,483 | B1 | 7/2001 | Acres |
| 6,264,560 | B1 | 7/2001 | Goldberg et al. |
| 6,270,409 | B1 | 8/2001 | Shuster |
| 6,289,382 | B1 | 9/2001 | Bowman-Amuah |
| 6,293,866 | B1 | 9/2001 | Walker et al. |
| 6,293,868 | B1 | 9/2001 | Bernard |
| 6,302,793 | B1 | 10/2001 | Fertitta, III et al. |
| 6,315,662 | B1 | 11/2001 | Jorasch et al. |
| 6,315,666 | B1 | 11/2001 | Mastera et al. |
| 6,319,122 | B1 | 11/2001 | Packes et al. |
| 6,319,125 | B1 | 11/2001 | Acres |
| 6,336,859 | B2 | 1/2002 | Jones et al. |
| 6,347,996 | B1 | 2/2002 | Gilmore et al. |
| 6,364,314 | B1 | 4/2002 | Canterbury |
| 6,368,216 | B1 | 4/2002 | Hedrick |
| 6,371,852 | B1 | 4/2002 | Acres |
| 6,375,567 | B1 | 4/2002 | Acres |
| 6,425,823 | B1 | 7/2002 | Byrne |
| 6,428,002 | B1 | 8/2002 | Baranauskas |
| 6,443,456 | B1 | 9/2002 | Gajor |
| 6,454,648 | B1 | 9/2002 | Kelly et al. |
| 6,457,045 | B1 | 9/2002 | Hanson et al. |
| 6,471,588 | B2 | 10/2002 | Sakamoto |
| 6,485,367 | B1 | 11/2002 | Joshi |
| 6,485,368 | B2 | 11/2002 | Jones et al. |
| 6,520,856 | B1 | 2/2003 | Walker et al. |
| 6,565,434 | B1 | 5/2003 | Acres |
| 6,565,436 | B1 | 5/2003 | Baerlocher |
| 6,569,013 | B1 | 5/2003 | Taylor |
| 6,575,832 | B1 | 6/2003 | Manfredi et al. |
| 6,592,457 | B1 | 7/2003 | Frohm et al. |
| 6,599,186 | B1 | 7/2003 | Walker et al. |
| 6,599,193 | B2 | 7/2003 | Baerlocher et al. |
| 6,606,615 | B1 | 8/2003 | Jennings et al. |
| 6,620,046 | B2 | 9/2003 | Rowe |
| 6,634,922 | B1 | 10/2003 | Driscoll et al. |
| 6,648,757 | B1 | 11/2003 | Slomiany et al. |
| 6,652,378 | B2 | 11/2003 | Cannon et al. |
| 6,656,047 | B1 | 12/2003 | Tarantino et al. |
| 6,695,700 | B2 | 2/2004 | Walker et al. |
| 6,697,165 | B2 | 2/2004 | Wakai et al. |
| 6,702,670 | B2 | 3/2004 | Jasper et al. |
| 6,709,331 | B2 | 3/2004 | Berman |
| 6,712,693 | B1 | 3/2004 | Hettinger |
| 6,712,695 | B2 | 3/2004 | Mothwurf et al. |
| 6,722,985 | B2 | 4/2004 | Criss-Puszkiewicz et al. |
| 6,749,510 | B2 | 6/2004 | Giobbi |
| 6,751,657 | B1 | 6/2004 | Zothner |
| 6,755,420 | B2 | 6/2004 | Colton |
| 6,758,754 | B1 | 7/2004 | Lavanchy et al. |
| 6,760,595 | B2 | 7/2004 | Inselberg |
| 6,780,104 | B2 | 8/2004 | Fox |
| 6,786,824 | B2 | 9/2004 | Cannon |
| 6,800,026 | B2 | 10/2004 | Cannon |
| 6,800,027 | B2 | 10/2004 | Giobbi et al. |
| 6,802,778 | B1 | 10/2004 | Lemay et al. |
| 6,811,482 | B2 | 11/2004 | Letvosky |
| 6,811,486 | B1 | 11/2004 | Luciano, Jr. |
| 6,860,808 | B2 | 3/2005 | Levitan |
| 6,860,810 | B2 | 3/2005 | Cannon et al. |
| 6,939,227 | B2 | 9/2005 | Jorasch et al. |
| 6,944,509 | B2 | 9/2005 | Altmaier et al. |
| 6,948,171 | B2 | 9/2005 | Dan et al. |

(56) References Cited

U.S. PATENT DOCUMENTS

| | | | |
|---|---|---|---|
| 6,965,868 | B1 | 11/2005 | Bednarek |
| 6,973,665 | B2 | 12/2005 | Dudkiewicz et al. |
| RE38,982 | E | 2/2006 | Forte et al. |
| 6,997,380 | B2 | 2/2006 | Safaei et al. |
| 6,998,806 | B2 | 2/2006 | Suzuki |
| 7,037,195 | B2 | 5/2006 | Schneider et al. |
| 7,056,210 | B2 | 6/2006 | Bansemer et al. |
| 7,069,232 | B1 | 6/2006 | Fox et al. |
| 7,090,579 | B2 | 8/2006 | Tarantino |
| 7,094,149 | B2 | 8/2006 | Walker et al. |
| 7,094,150 | B2 | 8/2006 | Ungaro et al. |
| 7,103,560 | B1 | 9/2006 | Fox et al. |
| 7,131,908 | B2 | 11/2006 | Baerlocher |
| 7,144,322 | B2 | 12/2006 | Gomez et al. |
| 7,169,052 | B2 | 1/2007 | Beaulieu et al. |
| 7,175,521 | B2 | 2/2007 | McClintic |
| 7,182,690 | B2 | 2/2007 | Giobbi et al. |
| 7,184,965 | B2 | 2/2007 | Fox et al. |
| 7,186,181 | B2 | 3/2007 | Rowe |
| 7,192,346 | B2 | 3/2007 | Mathis |
| 7,195,243 | B2 | 3/2007 | Kenny et al. |
| 7,201,654 | B1 | 4/2007 | Jarvis et al. |
| 7,251,805 | B2 | 7/2007 | Koo |
| 7,300,351 | B2 | 11/2007 | Thomas |
| 7,329,185 | B2 | 2/2008 | Conover et al. |
| 7,338,372 | B2 | 3/2008 | Morrow et al. |
| 7,361,089 | B2 | 4/2008 | Daly et al. |
| 7,374,486 | B2 | 5/2008 | Baerlocher |
| 7,410,422 | B2 | 8/2008 | Fine |
| 7,416,186 | B2 | 8/2008 | Walker et al. |
| 7,458,892 | B2 | 12/2008 | Walker et al. |
| 7,594,851 | B2 | 9/2009 | Falconer |
| 7,601,060 | B2 | 10/2009 | Baerlocher et al. |
| 7,628,691 | B2 | 12/2009 | Luciano et al. |
| 7,674,180 | B2 | 3/2010 | Graham et al. |
| 7,717,788 | B2 | 5/2010 | Rowe |
| 7,765,121 | B2 | 7/2010 | Pace et al. |
| 7,775,876 | B2 | 8/2010 | Rowe |
| 7,780,520 | B2 | 8/2010 | Baerlocher |
| 7,811,167 | B2 | 10/2010 | Giobbi et al. |
| 7,846,018 | B2 | 12/2010 | Baelocher |
| 7,874,911 | B2 | 1/2011 | Walker et al. |
| 7,963,844 | B2 | 6/2011 | Walker et al. |
| 8,052,517 | B2 | 11/2011 | Manfredi et al. |
| 2001/0004609 | A1 | 6/2001 | Walker et al. |
| 2001/0024015 | A1 | 9/2001 | Hogan et al. |
| 2001/0046893 | A1 | 11/2001 | Giobbi et al. |
| 2001/0048193 | A1 | 12/2001 | Yoseloff et al. |
| 2002/0013173 | A1 | 1/2002 | Walker et al. |
| 2002/0016202 | A1 | 2/2002 | Fertitta et al. |
| 2002/0019253 | A1 | 2/2002 | Reitzen et al. |
| 2002/0032052 | A1 | 3/2002 | Levitan |
| 2002/0034981 | A1 | 3/2002 | Hisada |
| 2002/0039923 | A1 | 4/2002 | Cannon et al. |
| 2002/0055381 | A1 | 5/2002 | Tarantino |
| 2002/0086726 | A1 | 7/2002 | Ainsworth |
| 2002/0090987 | A1 | 7/2002 | Walker et al. |
| 2002/0094855 | A1 | 7/2002 | Berman |
| 2002/0103018 | A1 | 8/2002 | Rommerdahl et al. |
| 2002/0107072 | A1 | 8/2002 | Giobbi |
| 2002/0123376 | A1 | 9/2002 | Walker et al. |
| 2002/0132664 | A1 | 9/2002 | Miller et al. |
| 2002/0142825 | A1 | 10/2002 | Lark et al. |
| 2002/0143652 | A1 | 10/2002 | Beckett |
| 2002/0147040 | A1 | 10/2002 | Walker et al. |
| 2002/0147043 | A1 | 10/2002 | Shulman et al. |
| 2002/0152120 | A1 | 10/2002 | Howington |
| 2002/0167126 | A1 | 11/2002 | De Raedt et al. |
| 2002/0177480 | A1 | 11/2002 | Rowe |
| 2002/0177483 | A1 | 11/2002 | Cannon |
| 2002/0187834 | A1 | 12/2002 | Rowe et al. |
| 2002/0193162 | A1 | 12/2002 | Walker et al. |
| 2003/0003989 | A1 | 1/2003 | Johnson |
| 2003/0013512 | A1 | 1/2003 | Rowe et al. |
| 2003/0017865 | A1 | 1/2003 | Beaulieu et al. |
| 2003/0032474 | A1 | 2/2003 | Kaminkow |
| 2003/0036425 | A1 | 2/2003 | Kaminkow et al. |
| 2003/0054878 | A1 | 3/2003 | Bonoy et al. |
| 2003/0054881 | A1 | 3/2003 | Hedrick et al. |
| 2003/0060276 | A1 | 3/2003 | Walker et al. |
| 2003/0064769 | A1 | 4/2003 | Muir |
| 2003/0064771 | A1 | 4/2003 | Morrow et al. |
| 2003/0067116 | A1 | 4/2003 | Colton |
| 2003/0078101 | A1 | 4/2003 | Schneider et al. |
| 2003/0083943 | A1 | 5/2003 | Adams et al. |
| 2003/0087685 | A1 | 5/2003 | Hogan et al. |
| 2003/0092484 | A1 | 5/2003 | Schneider et al. |
| 2003/0100360 | A1 | 5/2003 | Manfredi et al. |
| 2003/0114217 | A1 | 6/2003 | Walker et al. |
| 2003/0119575 | A1 | 6/2003 | Centuori et al. |
| 2003/0135304 | A1 | 7/2003 | Sroub et al. |
| 2003/0144048 | A1 | 7/2003 | Silva |
| 2003/0157978 | A1 | 8/2003 | Englman |
| 2003/0178774 | A1 | 9/2003 | Marcilio |
| 2003/0186733 | A1 | 10/2003 | Wolf et al. |
| 2003/0187736 | A1 | 10/2003 | Teague et al. |
| 2003/0190944 | A1 | 10/2003 | Manfredi et al. |
| 2003/0195029 | A1 | 10/2003 | Frohm et al. |
| 2003/0199295 | A1 | 10/2003 | Vancura |
| 2003/0199312 | A1 | 10/2003 | Walker et al. |
| 2003/0204474 | A1 | 10/2003 | Capek et al. |
| 2003/0207711 | A1 | 11/2003 | Rowe |
| 2003/0209853 | A1 | 11/2003 | Harris |
| 2003/0211884 | A1 | 11/2003 | Gauselmann |
| 2003/0216169 | A1 | 11/2003 | Walker et al. |
| 2003/0220138 | A1 | 11/2003 | Walker et al. |
| 2003/0220139 | A1 | 11/2003 | Peterson |
| 2003/0220143 | A1 | 11/2003 | Shteyn et al. |
| 2003/0228901 | A1 | 12/2003 | Walker et al. |
| 2003/0232640 | A1 | 12/2003 | Walker et al. |
| 2003/0234489 | A1 | 12/2003 | Okada |
| 2003/0236110 | A1 | 12/2003 | Beaulieu et al. |
| 2004/0002386 | A1* | 1/2004 | Wolfe ................ G07F 17/3218 463/40 |
| 2004/0009808 | A1 | 1/2004 | Gauselmann |
| 2004/0023715 | A1* | 2/2004 | Luciano, Jr. ........ G07F 17/3244 463/25 |
| 2004/0038735 | A1 | 2/2004 | Stell et al. |
| 2004/0038736 | A1 | 2/2004 | Bryant et al. |
| 2004/0048650 | A1 | 3/2004 | Mierau et al. |
| 2004/0053657 | A1 | 3/2004 | Fiden et al. |
| 2004/0053681 | A1 | 3/2004 | Jordan et al. |
| 2004/0063484 | A1 | 4/2004 | Dreaper et al. |
| 2004/0072609 | A1 | 4/2004 | Ungaro et al. |
| 2004/0092315 | A1 | 5/2004 | Boyd et al. |
| 2004/0103013 | A1 | 5/2004 | Jameson |
| 2004/0106449 | A1* | 6/2004 | Walker ................ G07F 17/3227 463/25 |
| 2004/0121833 | A1 | 6/2004 | Mezen et al. |
| 2004/0142742 | A1 | 7/2004 | Schneider et al. |
| 2004/0158536 | A1 | 8/2004 | Kowal et al. |
| 2004/0166940 | A1 | 8/2004 | Rothschild |
| 2004/0180722 | A1 | 9/2004 | Giobbi |
| 2004/0198485 | A1 | 10/2004 | Loose et al. |
| 2004/0203611 | A1 | 10/2004 | Laporta et al. |
| 2004/0204213 | A1 | 10/2004 | Schugar et al. |
| 2004/0204216 | A1 | 10/2004 | Schugar |
| 2004/0204222 | A1 | 10/2004 | Roberts |
| 2004/0214637 | A1 | 10/2004 | Nonaka |
| 2004/0219967 | A1 | 11/2004 | Giobbi et al. |
| 2004/0224750 | A1 | 11/2004 | Al-Ziyoud |
| 2004/0229671 | A1 | 11/2004 | Stronach et al. |
| 2004/0229683 | A1 | 11/2004 | Mothwurf et al. |
| 2004/0229700 | A1 | 11/2004 | Cannon et al. |
| 2004/0235542 | A1 | 11/2004 | Stronach et al. |
| 2004/0248642 | A1 | 12/2004 | Rothschild |
| 2004/0254010 | A1 | 12/2004 | Fine |
| 2004/0266517 | A1 | 12/2004 | Bleich et al. |
| 2005/0014558 | A1 | 1/2005 | Estey |
| 2005/0026674 | A1 | 2/2005 | Wolf et al. |
| 2005/0043072 | A1 | 2/2005 | Nelson |
| 2005/0043088 | A1 | 2/2005 | Nguyen et al. |
| 2005/0043092 | A1 | 2/2005 | Gauselmann |
| 2005/0043094 | A1 | 2/2005 | Nguyen et al. |

(56) References Cited

U.S. PATENT DOCUMENTS

2005/0049028 A1 3/2005 Gomez et al.
2005/0054438 A1 3/2005 Rothschild et al.
2005/0059467 A1 3/2005 Saffari et al.
2005/0070356 A1 3/2005 Mothwurf et al.
2005/0075164 A1 4/2005 Krynicky
2005/0096121 A1 5/2005 Gilliland et al.
2005/0096124 A1 5/2005 Stronach
2005/0101375 A1 5/2005 Webb et al.
2005/0101379 A1 5/2005 Falconer
2005/0119052 A1 6/2005 Russell et al.
2005/0124411 A1 6/2005 Schneider et al.
2005/0124415 A1 6/2005 Centuori et al.
2005/0148380 A1 7/2005 Cannon et al.
2005/0148383 A1 7/2005 Mayeroff
2005/0153773 A1 7/2005 Nguyen et al.
2005/0164764 A1 7/2005 Ghaly
2005/0176494 A1* 8/2005 Thomas .................. G07F 17/32
463/25
2005/0181856 A1 8/2005 Cannon et al.
2005/0181860 A1 8/2005 Nguyen et al.
2005/0181862 A1 8/2005 Asher et al.
2005/0187014 A1 8/2005 Saffari et al.
2005/0208995 A1 9/2005 Marshall et al.
2005/0215311 A1 9/2005 Hornik et al.
2005/0215314 A1 9/2005 Schneider et al.
2005/0215316 A1 9/2005 Rowe et al.
2005/0233794 A1 10/2005 Cannon et al.
2005/0239541 A1 10/2005 Jorasch et al.
2005/0239545 A1 10/2005 Rowe
2005/0251440 A1 11/2005 Bednarek
2005/0255902 A1 11/2005 Lind
2005/0266905 A1 12/2005 Emori et al.
2006/0009284 A1 1/2006 Schwartz et al.
2006/0025205 A1 2/2006 Casey et al.
2006/0025207 A1 2/2006 Walker et al.
2006/0025210 A1 2/2006 Johnson
2006/0030400 A1 2/2006 Mathis
2006/0040723 A1 2/2006 Baelocher et al.
2006/0040730 A1 2/2006 Walker et al.
2006/0046830 A1 3/2006 Webb
2006/0046835 A1 3/2006 Walker et al.
2006/0052160 A1 3/2006 Saffari et al.
2006/0058095 A1 3/2006 Berman et al.
2006/0058097 A1 3/2006 Berman et al.
2006/0068898 A1 3/2006 Maya
2006/0068899 A1 3/2006 White et al.
2006/0068903 A1 3/2006 Walker et al.
2006/0073872 A1 4/2006 B-Jensen et al.
2006/0073887 A1 4/2006 Nguyen et al.
2006/0079310 A1 4/2006 Friedman et al.
2006/0079314 A1 4/2006 Walker et al.
2006/0079321 A1* 4/2006 Walker ................ G07F 17/3258
463/25
2006/0084496 A1 4/2006 Jaffe et al.
2006/0094493 A1 5/2006 Kido
2006/0100009 A1 5/2006 Walker et al.
2006/0105836 A1 5/2006 Walker et al.
2006/0116201 A1 6/2006 Gauselmann
2006/0121972 A1 6/2006 Walker et al.
2006/0128467 A1 6/2006 Thomas
2006/0135249 A1 6/2006 Seelig et al.
2006/0148559 A1 7/2006 Jordan et al.
2006/0149632 A1 7/2006 Register et al.
2006/0154714 A1 7/2006 Montross et al.
2006/0174270 A1 8/2006 Westberg et al.
2006/0183530 A1 8/2006 Ellis
2006/0183536 A1 8/2006 Gagner et al.
2006/0199631 A1 9/2006 McGill et al.
2006/0211486 A1 9/2006 Walker et al.
2006/0217175 A1 9/2006 Walker et al.
2006/0229127 A1 10/2006 Walker et al.
2006/0247034 A1 11/2006 Schneider et al.
2006/0247041 A1 11/2006 Walker et al.
2006/0252510 A1 11/2006 Walker et al.
2006/0252512 A1 11/2006 Walker et al.
2006/0258422 A1 11/2006 Walker et al.
2006/0258425 A1 11/2006 Edidin et al.
2006/0258432 A1 11/2006 Packer et al.
2006/0281539 A1* 12/2006 Wilhite ............... G07F 17/3248
463/25
2006/0287034 A1 12/2006 Englman et al.
2006/0287045 A1 12/2006 Walker et al.
2006/0287098 A1 12/2006 Morrow et al.
2006/0287102 A1 12/2006 White et al.
2007/0001396 A1 1/2007 Walker et al.
2007/0010309 A1 1/2007 Giobbi et al.
2007/0010315 A1 1/2007 Hein
2007/0050256 A1 3/2007 Walker et al.
2007/0060252 A1 3/2007 Taylor
2007/0060274 A1 3/2007 Rowe et al.
2007/0060323 A1 3/2007 Isaac et al.
2007/0060387 A1 3/2007 Enzminger et al.
2007/0087834 A1* 4/2007 Moser ................. G07F 17/3255
463/42
2007/0105615 A1 5/2007 Lind
2007/0105618 A1 5/2007 Steil
2007/0106553 A1 5/2007 Jordan et al.
2007/0111776 A1 5/2007 Griswold et al.
2007/0112609 A1 5/2007 Howard et al.
2007/0117619 A1 5/2007 Walker et al.
2007/0117623 A1 5/2007 Nelson et al.
2007/0129147 A1 6/2007 Gagner
2007/0135214 A1 6/2007 Walker et al.
2007/0143156 A1 6/2007 van Deursen
2007/0167210 A1 7/2007 Kelly et al.
2007/0191087 A1 8/2007 Thomas et al.
2007/0197247 A1 8/2007 Inselberg
2007/0205556 A1 9/2007 Roemer et al.
2007/0239542 A1* 10/2007 Shapiro .............. G06Q 30/0277
705/14.54
2007/0259709 A1 11/2007 Kelly et al.
2007/0275777 A1 11/2007 Walker et al.
2008/0015004 A1 1/2008 Gatto et al.
2008/0039190 A1 2/2008 Walker et al.
2008/0045302 A1* 2/2008 Low ........................ G07F 17/34
463/20
2008/0058105 A1 3/2008 Combs et al.
2008/0064495 A1 3/2008 Bryant et al.
2008/0076576 A1 3/2008 Graham et al.
2008/0090651 A1 4/2008 Baerlocher
2008/0096639 A1 4/2008 Power
2008/0102921 A1 5/2008 Urquhart
2008/0102935 A1 5/2008 Finnimore
2008/0113749 A1 5/2008 Williams et al.
2008/0113773 A1 5/2008 Johnson et al.
2008/0113779 A1 5/2008 Cregan
2008/0113811 A1 5/2008 Lindard et al.
2008/0132320 A1 6/2008 Rodgers
2008/0146331 A1 6/2008 Nordman et al.
2008/0153564 A1 6/2008 Baerlocher et al.
2008/0171586 A1 7/2008 Roemer
2008/0176647 A1 7/2008 Acres
2008/0182655 A1 7/2008 DeWaal et al.
2008/0207313 A1 8/2008 Acres
2008/0220861 A1 9/2008 Okada
2008/0234035 A1 9/2008 Malek
2008/0242394 A1 10/2008 Sakuma
2008/0242398 A1 10/2008 Harris et al.
2008/0248851 A1 10/2008 Bloom
2008/0254886 A1 10/2008 Kelly
2008/0261699 A1 10/2008 Topham et al.
2008/0268959 A1 10/2008 Bryson et al.
2008/0280674 A1 11/2008 Sakuma
2008/0287186 A1 11/2008 Sakuma
2008/0293467 A1 11/2008 Mathis
2008/0318656 A1 12/2008 Walker et al.
2009/0005170 A9 1/2009 Kelly et al.
2009/0036202 A1 2/2009 Baerlocher et al.
2009/0070081 A1 3/2009 Saenz et al.
2009/0075728 A1 3/2009 Acres
2009/0088239 A1 4/2009 Iddings et al.
2009/0117981 A1 5/2009 Yoshizawa
2009/0124327 A1 5/2009 Caputo et al.
2009/0124364 A1 5/2009 Cuddy et al.

(56) References Cited

U.S. PATENT DOCUMENTS

| | | | |
|---|---|---|---|
| 2009/0131175 | A1 | 5/2009 | Kelly et al. |
| 2009/0170608 | A1 | 7/2009 | Herrmann et al. |
| 2009/0172035 | A1* | 7/2009 | Lessing .................. G06Q 30/02 |
| 2009/0176580 | A1 | 7/2009 | Herrmann et al. |
| 2009/0215523 | A1* | 8/2009 | Acres ...................... G07F 17/32 463/20 |
| 2009/0233682 | A1 | 9/2009 | Kato et al. |
| 2009/0239601 | A1 | 9/2009 | Macke |
| 2009/0239622 | A1 | 9/2009 | Fujimori et al. |
| 2009/0239628 | A1 | 9/2009 | Fujimori et al. |
| 2009/0247284 | A1 | 10/2009 | Sugiyama et al. |
| 2009/0253477 | A1 | 10/2009 | Teranishi |
| 2009/0253478 | A1 | 10/2009 | Walker et al. |
| 2009/0253490 | A1 | 10/2009 | Teranishi |
| 2009/0270168 | A1 | 10/2009 | Englman et al. |
| 2009/0286590 | A1 | 11/2009 | Bennett |
| 2009/0299833 | A1* | 12/2009 | Estep .................. G07F 17/3227 705/14.1 |
| 2009/0325669 | A1 | 12/2009 | Kelly et al. |
| 2009/0325670 | A1 | 12/2009 | Kelly et al. |
| 2010/0016055 | A1 | 1/2010 | Englman et al. |
| 2010/0041464 | A1 | 2/2010 | Arezina et al. |
| 2010/0048286 | A1 | 2/2010 | Okada et al. |
| 2010/0056248 | A1 | 3/2010 | Acres |
| 2010/0075741 | A1 | 3/2010 | Aoki et al. |
| 2010/0105454 | A1 | 4/2010 | Weber et al. |
| 2010/0105466 | A1 | 4/2010 | Inamura et al. |
| 2010/0113130 | A1 | 5/2010 | Kamano et al. |
| 2010/0124981 | A1 | 5/2010 | Kato et al. |
| 2010/0285867 | A1 | 11/2010 | Okada |
| 2010/0304834 | A1 | 12/2010 | Okada |
| 2011/0039615 | A1 | 2/2011 | Acres |
| 2011/0059800 | A1* | 3/2011 | Anderson ............. G07F 17/326 463/42 |
| 2011/0081958 | A1 | 4/2011 | Herrmann et al. |
| 2011/0117987 | A1 | 5/2011 | Aoki |
| 2011/0165938 | A1 | 7/2011 | Anderson et al. |
| 2011/0218030 | A1 | 9/2011 | Acres |
| 2011/0275438 | A9 | 11/2011 | Hardy et al. |
| 2011/0281632 | A1 | 11/2011 | Okada |
| 2011/0287826 | A1 | 11/2011 | Kato et al. |
| 2011/0294563 | A1 | 12/2011 | Jaffe |
| 2012/0077565 | A1 | 3/2012 | Barbalet |
| 2012/0115566 | A1 | 5/2012 | Fujisawa et al. |
| 2012/0190425 | A1 | 7/2012 | Barbalet |
| 2017/0186269 | A1 | 6/2017 | Acres |
| 2019/0114876 | A1 | 4/2019 | Acres |
| 2022/0292927 | A1* | 9/2022 | Bolling, Jr. ............. G06F 7/588 |

FOREIGN PATENT DOCUMENTS

| | | |
|---|---|---|
| EP | 0896308 | 2/1999 |
| EP | 0919965 | 6/1999 |
| EP | 0981397 | 3/2000 |
| EP | 1091789 | 4/2001 |
| EP | 1231577 | 8/2002 |
| EP | 1351180 | 10/2003 |
| EP | 1369830 | 12/2003 |
| EP | 1490849 | 12/2004 |
| EP | 1496419 | 1/2005 |
| EP | 1623375 | 2/2006 |
| EP | 1637196 | 3/2006 |
| EP | 1832952 | 9/2007 |
| JP | 2-21883 | 1/1990 |
| WO | 1995/21665 | 8/1995 |
| WO | 1995/31262 | 11/1995 |
| WO | 1996/35490 | 11/1996 |
| WO | 1997/46293 | 12/1997 |
| WO | 2000/17825 | 3/2000 |
| WO | 2000/32286 | 6/2000 |
| WO | 200064545 | 11/2000 |
| WO | 2001/36059 | 5/2001 |
| WO | 2001/59680 | 8/2001 |
| WO | 2001/80961 | 11/2001 |
| WO | 2003/066179 | 8/2003 |
| WO | 2003/089092 | 10/2003 |
| WO | 2005/029279 | 3/2005 |
| WO | 2005/029287 | 3/2005 |
| WO | 2005/099845 | 10/2005 |
| WO | 2005/113093 | 12/2005 |
| WO | 2006/014745 | 2/2006 |
| WO | 2006/014770 | 2/2006 |
| WO | 2006/014990 | 2/2006 |
| WO | 2006/032498 | 3/2006 |
| WO | 2006/036948 | 4/2006 |
| WO | 2006/055518 | 5/2006 |
| WO | 2006/060442 | 6/2006 |
| WO | 2006/060493 | 6/2006 |
| WO | 2007/087286 | 8/2007 |
| WO | 2008/02705 | 2/2008 |

OTHER PUBLICATIONS

Acres, John "Measuring the Player Experience: What a Squiggly Line Can Tell You," Inside Edge / Slot Manager, Jan. / Feb. 2009 pp. 28-29.

Acres, John, "An Ingenious Internet Marketing Tool," Slot Operations Management / Casino Enterprise Management, Aug. 2007, pp. 8-10.

"White Paper: An Analysis of Harrah's Total Rewards Players Rewards Program" written and published by Gaming Market Advisor on or before Dec. 31, 20006, retrieved from URL <http://www.gamingmarketadvisors.com/publications/Harrahs%20Total%20Rewards%20White%20Paper.pdf>, 41 pages.

* cited by examiner

METHOD FOR CONFIGURING CASINO OPERATIONS

CROSS REFERENCE TO RELATED APPLICATIONS

This application is a continuation of U.S. patent application Ser. No. 17/089,069, filed Nov. 4, 2020, which is a continuation of U.S. patent application Ser. No. 16/215,876 filed Dec. 11, 2018, now U.S. Pat. No. 10,846,982 issued Nov. 24, 2020, which is a continuation of U.S. patent application Ser. No. 15/459,898 filed Mar. 15, 2017, now U.S. Pat. No. 10,192,392 issued Jan. 29, 2019, which is a continuation of U.S. patent application Ser. No. 14/997,182 filed Jan. 15, 2016, now U.S. Pat. No. 9,633,528 issued Apr. 25, 2017, which is a divisional of and claims priority to U.S. patent application Ser. No. 12/272,646 filed Nov. 17, 2008, which is hereby incorporated by reference for all purposes.

FIELD OF THE INVENTION

This disclosure relates generally to operation of casinos and more particularly to operations including configuring games, advertising, and/or staffing.

BACKGROUND

Casino performance is affected by a host of factors, some of which the casino can control. Other factors are environmental factors over which the casino has no or little ability to control. For example, factors that the casino can control include its player-loyalty program, complementary amenities to players, promotions, and bonuses, which are awards given to players over and above any payment required by a paytable in a game. The type of games available to play, and factors such as their payback percentages, location, denomination, and speed are also under control of the casino.

The player-loyalty program tracks the play of enrolled players and typically provides goods and services, including additional gaming credits, in proportion to the amount wagered. All of the foregoing can be configured by the casino to be richer or leaner from the players' perspective. Obviously, if the casino is always packed with players there is little motivation to provide extensive promotional give-aways, free gaming credit, and lavish complementary amenities, all of which cut into casino profitability. On the other hand, if there are few players on the floor, profitability might be increased by spending more for these kinds of inducements to draw players to the games.

Another factor over which the casino can exert control is staffing levels, which are set by the casino. Too few staff for the customers results in poor service and may ultimately result in lower profitability, even thought there is a labor savings. Similarly, if there is too many staff for the crowd, although service is presumably at a high level, cost is up thus reducing profitability.

Advertising by the casino, either through print or broadcast media, or directly targeted by mail, email, phone call, text message, and similar communications, also affects business. Too little advertising may save money in the budget, but diminishing customer numbers results in decreased profitability. Like staffing, there is a law of diminishing returns: too much advertising may not be drawing in much in the way of additional players while increasing casino expenses.

Environmental factors over which the casino has virtually no control include such things as the weather, local traffic, cost and availability of transportation (gas, airline tickets, rental cars, etc.), and competition for the gaming dollar, including competitor casinos and other area events. The time of each day and the day of the week correlate with the numbers of players on a casino floor. Holidays and the times immediately before and after also have a generally known effect that either tends to increase or decrease the number of players.

It is extremely complex to consider all of the factors that might affect casino performance, such as profitability a market share, and to adjust the variables over which the casino can exert control in a way that optimizes desired performance.

DETAILED DESCRIPTION

Figure 1A:
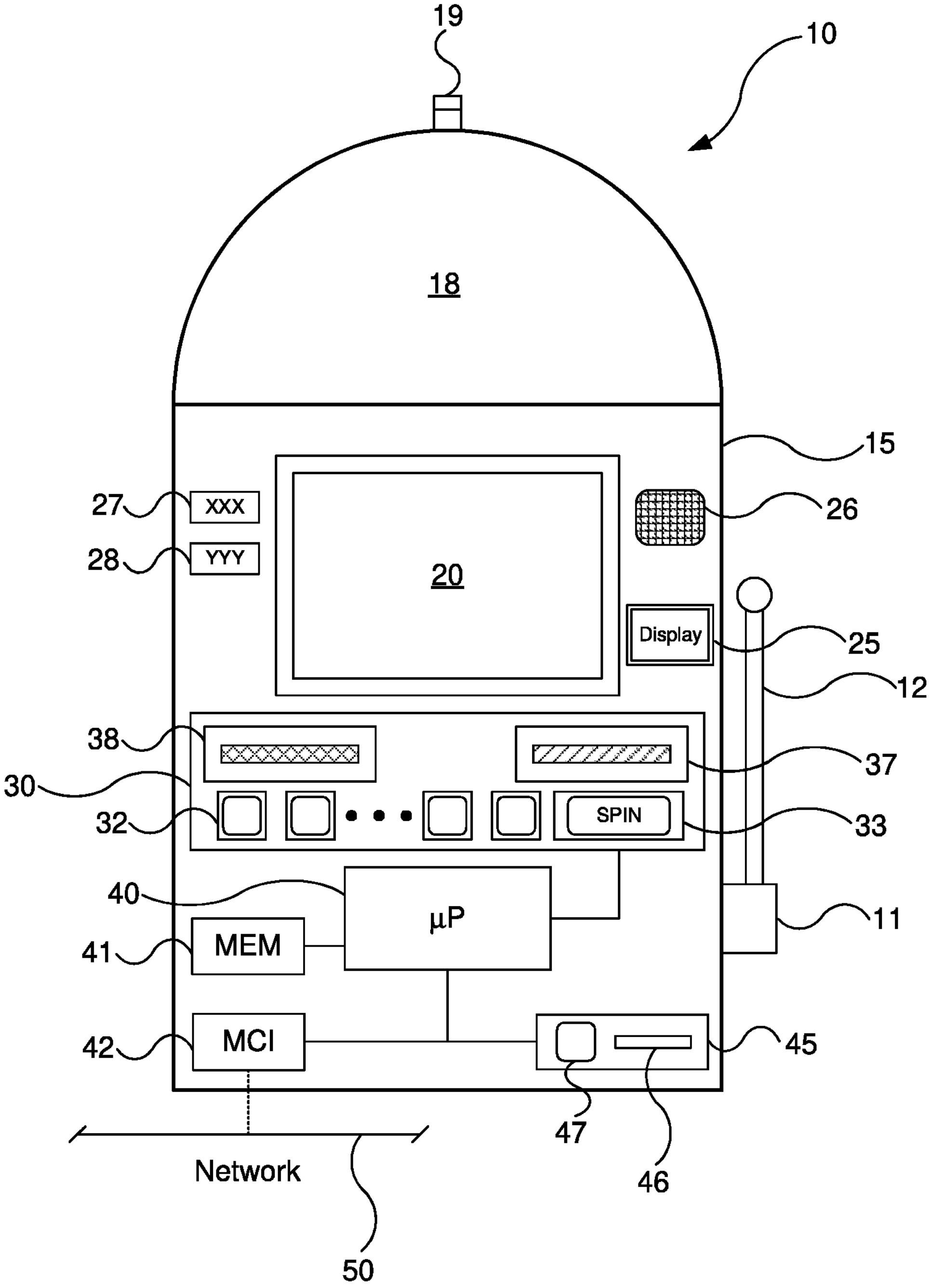
FIG. 1A is a functional block diagram that illustrates a gaming device according to embodiments of the invention.
Figure 1B:
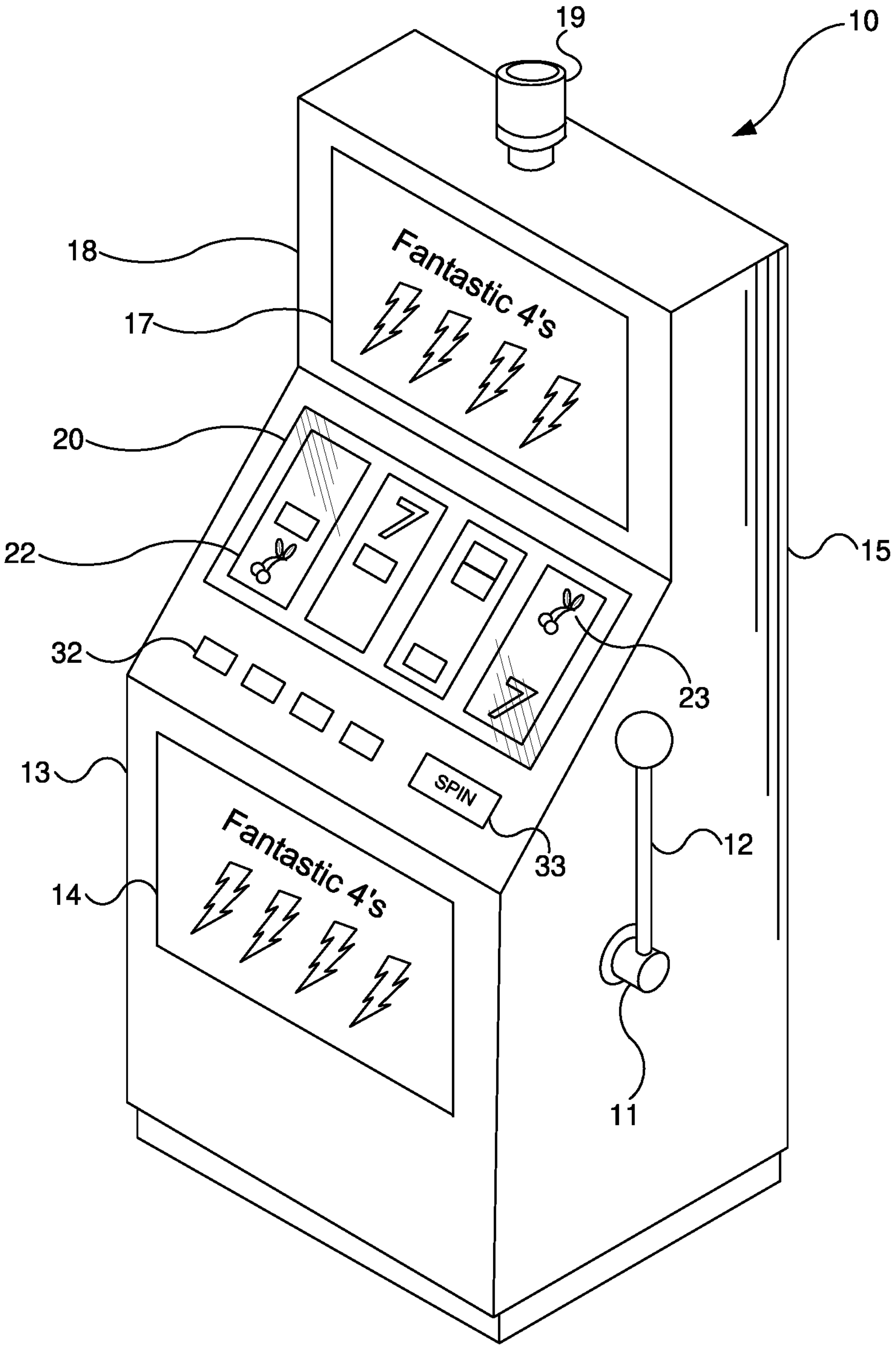
FIG. 1B is an isometric view of the gaming device illustrated in FIG. 1A.

FIGS. 1A and 1B illustrate example gaming devices according to embodiments of the invention.

Referring to FIGS. 1A and 1B, a gaming device 10 is an electronic gaming machine.

Although an electronic gaming machine or "slot" machine is illustrated, various other types of devices may be used to wager monetarily based credits on a game of chance in accordance with principles of the invention. The term "electronic gaming device" is meant to include various devices such as electro-mechanical spinning-reel type slot machines, video slot machines, and video poker machines, for instance. Other gaming devices may include computer-based gaming machines, wireless gaming devices, multi-player gaming stations, modified personal electronic gaming devices (such as cell phones), personal computers, server-based gaming terminals, and other similar devices. Although embodiments of the invention will work with all of the gaming types mentioned, for ease of illustration the present embodiments will be described in reference to the electronic gaming machine 10 shown in FIGS. 1A and 1B.

The gaming device 10 includes a cabinet 15 housing components to operate the gaming device 10. The cabinet 15 may include a gaming display 20, a base portion 13, a top box 18, and a player interface panel 30. The gaming display 20 may include mechanical spinning reels (FIG. 2A), a video display (FIGS. 2B and 2C), or a combination of both spinning reels and a video display (not shown). The gaming cabinet 15 may also include a credit meter 27 and a coin-in or bet meter 28. The credit meter 27 may indicate the total number of credits remaining on the gaming device 10 that are eligible to be wagered. In some embodiments, the credit meter 27 may reflect a monetary unit, such as dollars. However, it is often preferable to have the credit meter 27 reflect a number of 'credits,' rather than a monetary unit. The bet meter 28 may indicate the amount of credits to be wagered on a particular game. Thus, for each game, the player transfers the amount that he or she wants to wager from the credit meter 27 to the bet meter 28. In some embodiments, various other meters may be present, such as meters reflecting amounts won, amounts paid, or the like. In embodiments where the gaming display 20 is a video monitor, the information indicated on the credit meters may be shown on the gaming display itself 20 (FIG. 2B).

The base portion 13 may include a lighted panel 14, a coin return (not shown), and a gaming handle 12 operable on a partially rotating pivot joint 11. The game handle 12 is traditionally included on mechanical spinning-reel games, where the handle may be pulled toward a player to initiate the spinning of reels 22 after placement of a wager. The top box 18 may include a lighted panel 17, a video display (such as an LCD monitor), a mechanical bonus device (not shown), and a candle light indicator 19. The player interface panel 30 may include various devices so that a player can interact with the gaming device 10.

The player interface panel 30 may include one or more game buttons 32 that can be actuated by the player to cause the gaming device 10 to perform a specific action. For example, some of the game buttons 32 may cause the gaming device 10 to bet a credit to be wagered during the next game, change the number of lines being played on a multi-line game, cash out the credits remaining on the gaming device (as indicated on the credit meter 27), or request assistance from casino personnel, such as by lighting the candle 19. In addition, the player interface panel 30 may include one or more game actuating buttons 33. The game actuating buttons 33 may initiate a game with a pre-specified amount of credits. On some gaming devices 10 a "Max Bet" game actuating button 33 may be included that places the maximum credit wager on a game and initiates the game. The player interface panel 30 may further include a bill acceptor 37 and a ticket printer 38. The bill acceptor 37 may accept and validate paper money or previously printed tickets with a credit balance. The ticket printer 38 may print out tickets reflecting the balance of the credits that remain on the gaming device 10 when a player cashes out by pressing one of the game buttons 32 programmed to cause a 'cash-out.' These tickets may be inserted into other gaming machines or redeemed at a cashier station or kiosk for cash.

The gaming device 10 may also include one or more speakers 26 to transmit auditory information or sounds to the player. The auditory information may include specific sounds associated with particular events that occur during game play on the gaming device 10. For example, a particularly festive sound may be played during a large win or when a bonus is triggered. The speakers 26 may also transmit "attract" sounds to entice nearby players when the game is not currently being played.

The gaming device 10 may further include a secondary display 25. This secondary display 25 may be a vacuum fluorescent display (VFD), a liquid crystal display (LCD), a cathode ray tube (CRT), a plasma screen, or the like. The secondary display 25 may show any combination of primary game information and ancillary information to the player. For example, the secondary display 25 may show player tracking information, secondary bonus information, advertisements, or player selectable game options.

The gaming device 10 may include a separate information window (not shown) dedicated to supplying any combination of information related to primary game play, secondary bonus information, player tracking information, secondary bonus information, advertisements or player selectable game options. This window may be fixed in size and location or may have its size and location vary temporally as communication needs change. One example of such a resizable window is International Game Technology's "service window". Another example is Las Vegas Gaming Incorporated's retrofit technology which allows information to be placed over areas of the game or the secondary display screen at various times and in various situations.

The gaming device 10 includes a microprocessor 40 that controls operation of the gaming device 10. If the gaming device 10 is a standalone gaming device, the microprocessor 40 may control virtually all of the operations of the gaming devices and attached equipment, such as operating game logic stored in memory (not shown) as firmware, controlling the display 20 to represent the outcome of a game, communicating with the other peripheral devices (such as the bill acceptor 37), and orchestrating the lighting and sound emanating from the gaming device 10. In other embodiments where the gaming device 10 is coupled to a network 50, as described below, the microprocessor 40 may have different tasks depending on the setup and function of the gaming device. For example, the microprocessor 40 may be responsible for running the base game of the gaming device and executing instructions received over the network 50 from a bonus server or player tracking server. In a server-based gaming setup, the microprocessor 40 may act as a terminal to execute instructions from a remote server that is running game play on the gaming device.

The microprocessor 40 may be coupled to a machine communication interface (MCI) 42 that connects the gaming device 10 to a gaming network 50. The MCI 42 may be coupled to the microprocessor 40 through a serial connection, a parallel connection, an optical connection, or in some cases a wireless connection. The gaming device 10 may include memory 41 (MEM), such as a random access memory (RAM), coupled to the microprocessor 40 and which can be used to store gaming information, such as storing total coin-in statistics about a present or past gaming session, which can be communicated to a remote server or database through the MCI 42. The MCI 42 may also facilitate communication between the network 50 and the secondary display 25 or a player tracking unit 45 housed in the gaming cabinet 15.

The player tracking unit 45 may include an identification device 46 and one or more buttons 47 associated with the player tracking unit 45. The identification device 46 serves to identify a player, by, for example, reading a player-tracking device, such as a player tracking card that is issued by the casino to individual players who choose to have such a card. The identification device 46 may instead, or additionally, identify players through other methods. Player tracking systems using player tracking cards and card readers 46 are known in the art. Briefly summarizing such a system, a player registers with the casino prior to commencing gaming. The casino issues a unique player-tracking card to the player and opens a corresponding player account that is stored on a server or host computer, described below with reference to FIG. 3. The player account may include the player's name and mailing address and other information of interest to the casino in connection with marketing efforts. Prior to playing one of the gaming devices in the casino, the player inserts the player tracking card into the identification device 46 thus permitting the casino to track player activity, such as amounts wagered, credits won, and rate of play.

To induce the player to use the card and be an identified player, the casino may award each player points proportional to the money or credits wagered by the player. Players typically accrue points at a rate related to the amount wagered, although other factors may cause the casino to award the player various amounts. The points may be displayed on the secondary display 25 or using other methods. In conventional player tracking systems, the player may take his or her card to a special desk in the casino where a casino employee scans the card to determine how many accrued points are in the player's account. The player may redeem points for selected merchandise, meals in casino restaurants, or the like, which each have assigned point values. In some player tracking systems, the player may use the secondary display 25 to access their player tracking account, such as to check a total number of points, redeem points for various services, make changes to their account, or download promotional credits to the gaming device 10. In other embodiments, the identification device 46 may read other identifying cards (such as driver licenses, credit cards, etc.) to identify a player and match them to a corresponding player tracking account. Although FIG. 1A shows the player tracking unit 45 with a card reader as the identification device 46, other embodiments may include a player tracking unit 45 with a biometric scanner, PIN code acceptor, or other methods of identifying a player to pair the player with their player tracking account.

During typical play on a gaming device 10, a player plays a game by placing a wager and then initiating a gaming session. The player may initially insert monetary bills or previously printed tickets with a credit value into the bill acceptor 37. The player may also put coins into a coin acceptor (not shown) or a credit, debit or casino account card into a card reader/authorizer (not shown). One of skill in the art will readily see that this invention is useful with all gambling devices, regardless of the manner in which wager value-input is accomplished.

The credit meter 27 displays the numeric credit value of the money inserted dependent on the denomination of the gaming device 10. That is, if the gaming device 10 is a nickel slot machine and a $20 bill inserted into the bill acceptor 37, the credit meter will reflect 400 credits or one credit for each nickel of the inserted twenty dollars. For gaming devices 10 that support multiple denominations, the credit meter 27 will reflect the amount of credits relative to the denomination selected. Thus, in the above example, if a penny denomination is selected after the $20 is inserted the credit meter will change from 400 credits to 2000 credits.

A wager may be placed by pushing one or more of the game buttons 32, which may be reflected on the bet meter 28. That is, the player can generally depress a "bet one" button (one of the buttons on the player interface panel 30, such as 32), which transfers one credit from the credit meter 27 to the bet meter 28. Each time the button 32 is depressed an additional single credit transfers to the bet meter 28 up to a maximum bet that can be placed on a single play of the electronic gaming device 10. The gaming session may be initiated by pulling the gaming handle 12 or depressing the spin button 33. On some gaming devices 10, a "max bet" button (another one of the buttons 32 on the player interface panel 30) may be depressed to wager the maximum number of credits supported by the gaming device 10 and initiate a gaming session. If the gaming session does not result in any winning combination, the process of placing a wager may be repeated by the player. Alternatively, the player may cash out any remaining credits on the credit meter 27 by depressing the "cash-out" button (another button 32 on the player interface panel 30), which causes the credits on the credit meter 27 to be paid out in the form of a ticket through the ticket printer 38, or may be paid out in the form of returning coins from a coin hopper (not shown) to a coin return tray.

If instead a winning combination (win) appears on the display 20, the award corresponding to the winning combination is immediately applied to the credit meter 27. For example, if the gaming device 10 is a slot machine, a winning combination of symbols 23 may land on a played payline on reels 22. If any bonus games are initiated, the gaming device 10 may enter into a bonus mode or simply award the player with a bonus amount of credits that are applied to the credit meter 27.

Figure 2A:
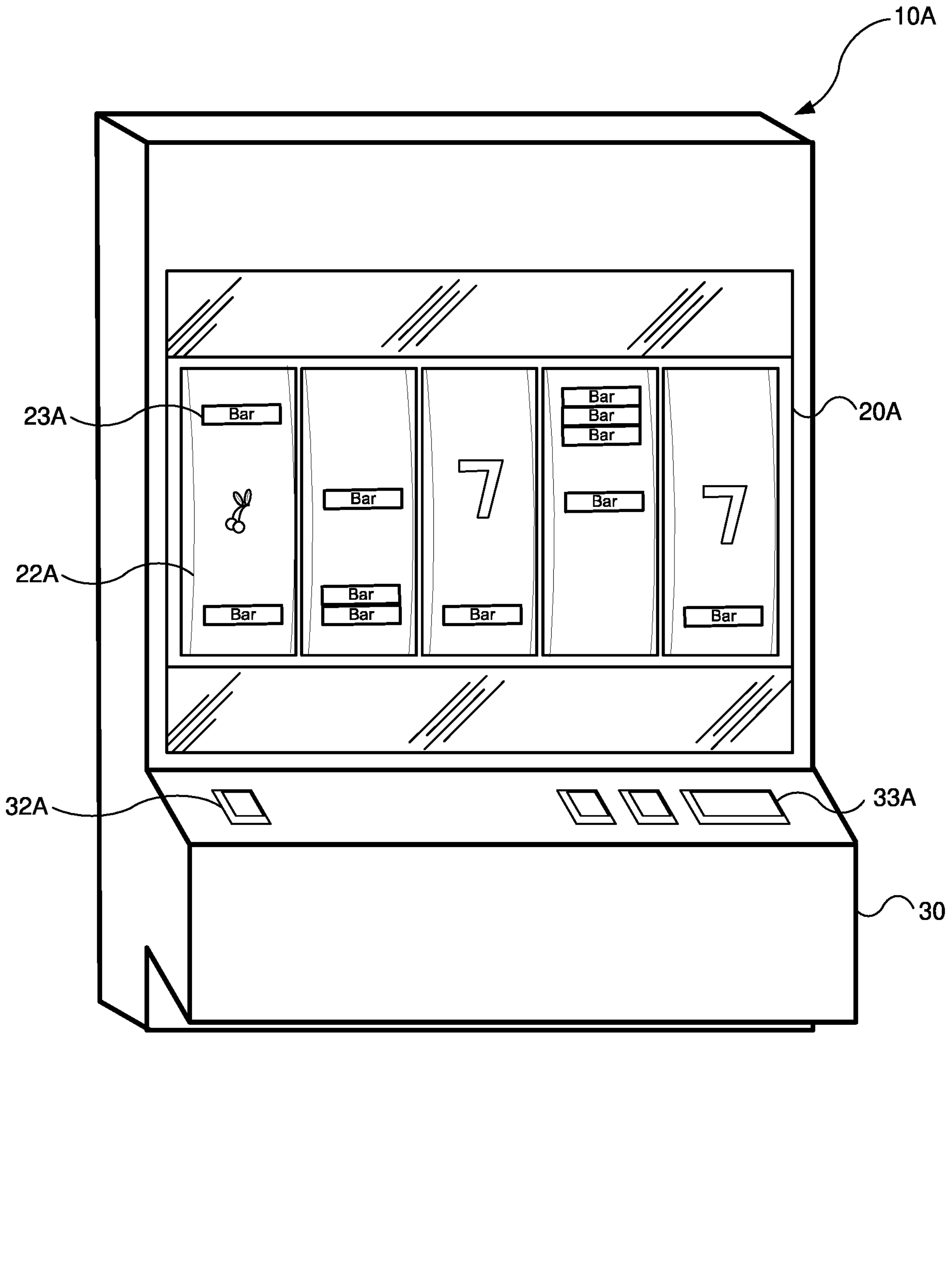
FIGS. 2A, 2B, and 2C are detail diagrams of exemplary types of gaming devices according to embodiments of the invention.
Figure 2B:
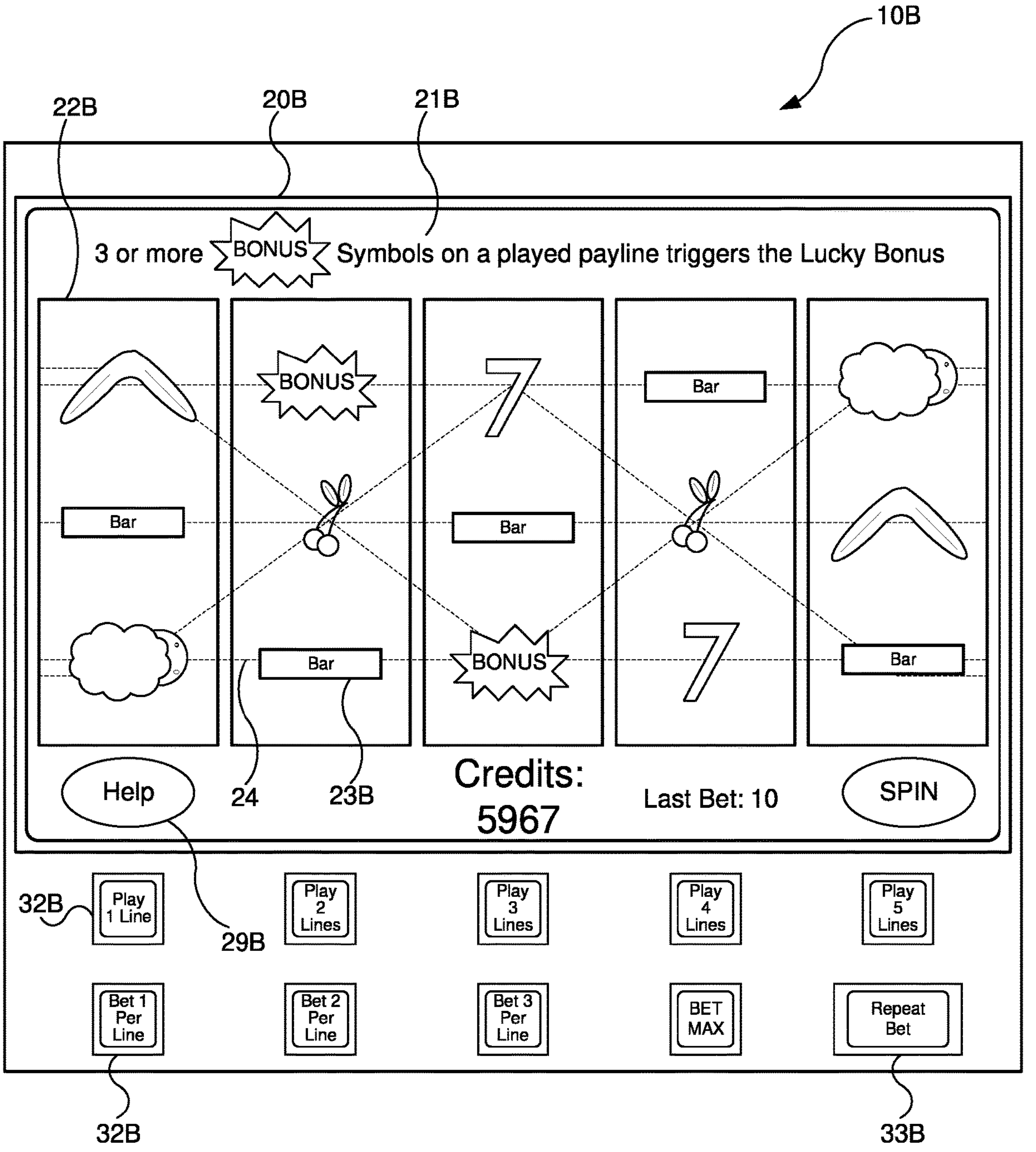
Figure 2C:
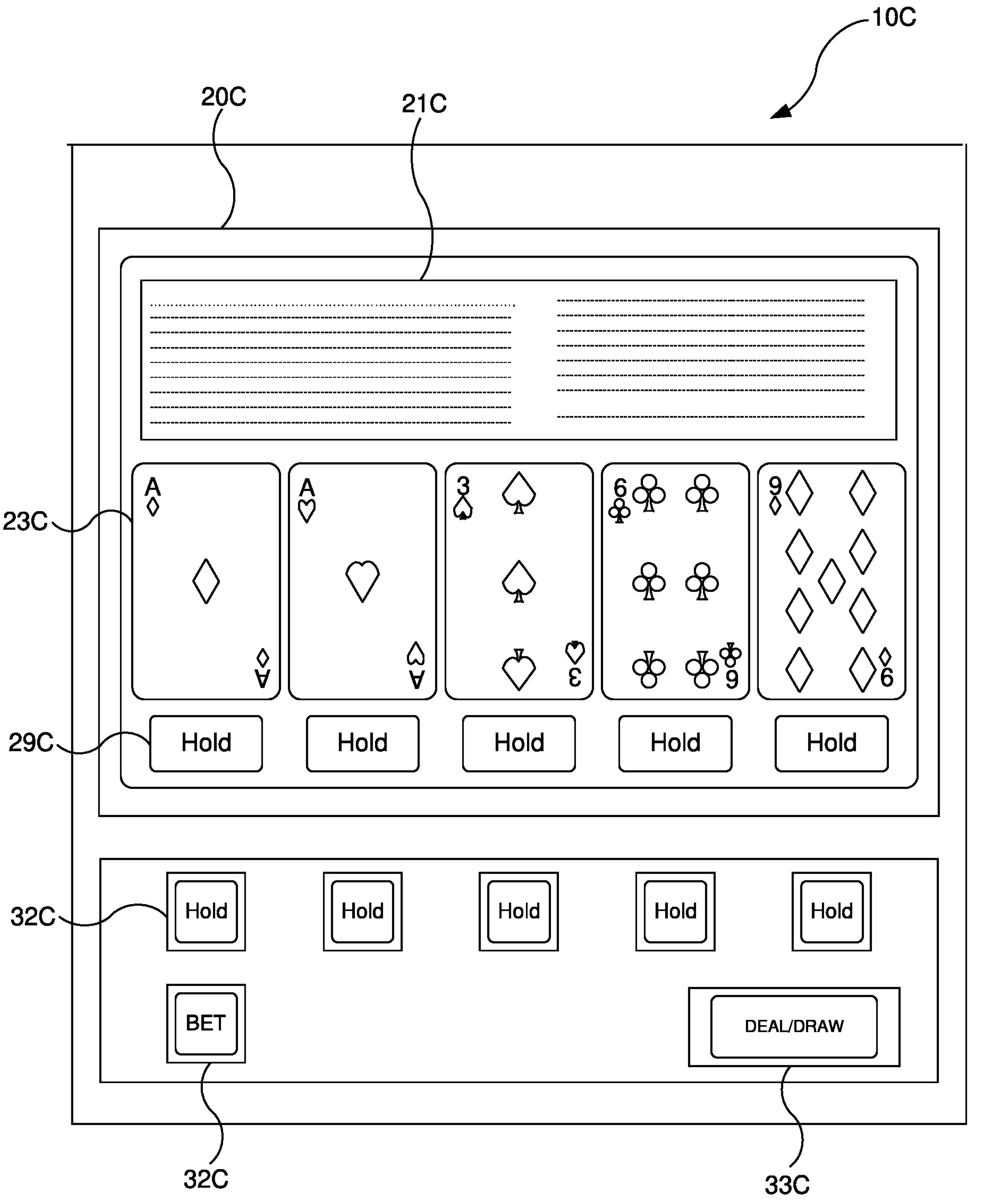

FIGS. 2A to 2C illustrate exemplary types of gaming devices according to embodiments of the invention. FIG. 2A illustrates an example spinning-reel gaming machine 10A, FIG. 2B illustrates an example video slot machine 10B, and FIG. 2C illustrates an example video poker machine 10C.

Referring to FIG. 2A, a spinning-reel gaming machine 10A includes a gaming display 20A having a plurality of mechanical spinning reels 22A. Typically, spinning-reel gaming machines 10A have three to five spinning reels 22A. Each of the spinning reels 22A has multiple symbols 23A that may be separated by blank areas on the spinning reels 22A, although the presence of blank areas typically depends on the number of reels 22A present in the gaming device 10A and the number of different symbols 23A that may appear on the spinning reels 22A. Each of the symbols 22A or blank areas makes up a "stop" on the spinning reel 22A where the reel 22A comes to rest after a spin. Although the spinning reels 22A of various games 10A may have various numbers of stops, many conventional spinning-reel gaming devices 10A have reels 22A with twenty two stops.

During game play, the spinning reels 22A may be controlled by stepper motors (not shown) under the direction of the microprocessor 40 (FIG. 1A). Thus, although the spinning-reel gaming device 10A has mechanical based spinning reels 22A, the movement of the reels themselves is electronically controlled to spin and stop. This electronic control is advantageous because it allows a virtual reel strip to be stored in the memory 41 of the gaming device 10A, where various "virtual stops" are mapped to each physical stop on the physical reel 22A. This mapping allows the gaming device 10A to establish greater awards and bonuses available to the player because of the increased number of possible combinations afforded by the virtual reel strips.

A gaming session on a spinning reel slot machine 10A typically includes the player pressing the "bet-one" button (one of the game buttons 32A) to wager a desired number of credits followed by pulling the gaming handle 12 (FIGS. 1A, 1B) or pressing the spin button 33A to spin the reels 22A. Alternatively, the player may simply press the "max-bet" button (another one of the game buttons 32A) to both wager the maximum number of credits permitted and initiate the spinning of the reels 22A. The spinning reels 22A may all stop at the same time or may individually stop one after another (typically from left to right) to build player anticipation.

Because the display 20A usually cannot be physically modified, some spinning reel slot machines 10A include an electronic display screen in the top box 18 (FIG. 1B), a mechanical bonus mechanism in the top box 18, or a secondary display 25 (FIG. 1A) to execute a bonus.

Referring to FIG. 2B, a video gaming machine 10B may include a video display 20B to display virtual spinning reels 22B and various other gaming information 21B. The video display 20B may be a CRT, LCD, plasma screen, or the like. It is usually preferable that the video display 20B be a touchscreen to accept player input. A number of symbols 23A appear on each of the virtual spinning reels 22B. Although FIG. 2B shows five virtual spinning reels 22B, the flexibility of the video display 20B allows for various reel 22B and game configurations. For example, some video slot games 10B spin reels for each individual symbol position (or stop) that appears on the video display 20B. That is, each symbol position on the screen is independent of every other position during the gaming sessions. In these types of games, very large numbers of pay lines or multiple super scatter pays can be utilized since similar symbols could appear at every symbol position on the video display 20B. On the other hand, other video slot games 10B more closely resemble the mechanical spinning reel games where symbols that are vertically adjacent to each other are part of the same continuous virtual spinning reel 22B.

Because the virtual spinning reels 22B, by virtue of being computer implemented, can have almost any number of stops on a reel strip, it is much easier to have a greater variety of displayed outcomes as compared to spinning-reel slot machines 10A (FIG. 2A) that have a fixed number of physical stops on each spinning reel 22A.

With the possible increases in reel 22B numbers and configurations over the mechanical gaming device 10A, video gaming devices 10B often have multiple paylines 24 that may be played. By having more paylines 24 available to play, the player may be more likely to have a winning combination when the reels 22B stop and the gaming session ends. However, since the player typically must wager at least a minimum number of credits to enable each payline 24 to be eligible for winning, the overall odds of winning are not much different, if at all, than if the player is wagering only on a single payline. For example, in a five line game, the player may bet one credit per payline 24 and be eligible for winning symbol combinations that appear on any of the five played paylines 24. This gives a total of five credits wagered and five possible winning paylines 24. If, on the other hand, the player only wagers one credit on one payline 24, but plays five gaming sessions, the odds of winning would be identical as above: five credits wagered and five possible winning paylines 24.

Because the video display 20B can easily modify the image output by the video display 20B, bonuses, such as second screen bonuses are relatively easy to award on the video slot game 10B. That is, if a bonus is triggered during game play, the video display 20B may simply store the resulting screen shot in memory and display a bonus sequence on the video display 20B. After the bonus sequence is completed, the video display 20B may then retrieve the previous screen shot and information from memory, and re-display that image.

Also, as mentioned above, the video display 20B may allow various other game information 21B to be displayed. For example, as shown in FIG. 2B, banner information may be displayed above the spinning reels 22B to inform the player, perhaps, which symbol combination is needed to trigger a bonus. Also, instead of providing a separate credit meter 27 (FIG. 1A) and bet meter 28, the same information can instead be displayed on the video display 20B. In addition, "soft buttons" 29B such as a "spin" button or "help/see pays" button may be built using the touch screen video display 20B. Such customization and ease of changing the image shown on the display 20B adds to the flexibility of the game 10B.

Even with the improved flexibility afforded by the video display 20B, several physical buttons 32B and 33B are usually provided on video slot machines 10B. These buttons may include game buttons 32B that allow a player to choose the number of paylines 24 he or she would like to play and the number of credits wagered on each payline 24. In addition, a max bet button (one of the game buttons 32B) allows a player to place a maximum credit wager on the maximum number of available paylines 24 and initiate a gaming session. A repeat bet or spin button 33B may also be used to initiate each gaming session when the max bet button is not used.

Referring to FIG. 2C, a video poker gaming device 10C may include a video display 20C that is physically similar to the video display 20B shown in FIG. 2B. The video display 20C may show a poker hand of five cards 23C and various other player information 21C including a paytable for various winning hands, as well as a plurality of player selectable soft buttons 29C. The video display 20C may present a poker hand of five cards 23C and various other player information 21C including a number of player selectable soft (touch-screen) buttons 29C and a paytable for various winning hands. Although the embodiment illustrated in FIG. 3C shows only one hand of poker on the video display 20C, various other video poker machines 10C may show several poker hands (multi-hand poker). Typically, video poker machines 10C play "draw" poker in which a player is dealt a hand of five cards, has the opportunity to hold any combination of those five cards, and then draws new cards to replace the discarded ones. All pays are usually given for winning combinations resulting from the final hand, although some video poker games 10C may give bonus credits for certain combinations received on the first hand before the draw. In the example shown in FIG. 2C a player has been dealt two aces, a three, a six, and a nine. The video poker game 10C may provide a bonus or payout for the player having been dealt the pair of aces, even before the player decides what to discard in the draw. Since pairs, three of a kind, etc. are typically needed for wins, a player would likely hold the two aces that have been dealt and draw three cards to replace the three, six, and nine in the hope of receiving additional aces or other cards leading to a winning combination with a higher award amount. After the draw and revealing of the final hand, the video poker game 10C typically awards any credits won to the credit meter.

The player selectable soft buttons 29C appearing on the screen respectively correspond to each card on the video display 20C. These soft buttons 29C allow players to select specific cards on the video display 20C such that the card corresponding to the selected soft button is "held" before the draw. Typically, video poker machines 10C also include physical game buttons 32C that correspond to the cards in the hand and may be selected to hold a corresponding card. A deal/draw button 33C may also be included to initiate a gaming session after credits have been wagered (with a bet button 32C, for example) and to draw any cards not held after the first hand is displayed.

Although examples of a spinning reel slot machine 10A, a video slot machine 10B, and a video poker machine 10C have been illustrated in FIGS. 2A-2C, gaming machines and various other types of gaming devices known in the art are contemplated and are within the scope of the invention.

Figure 3:
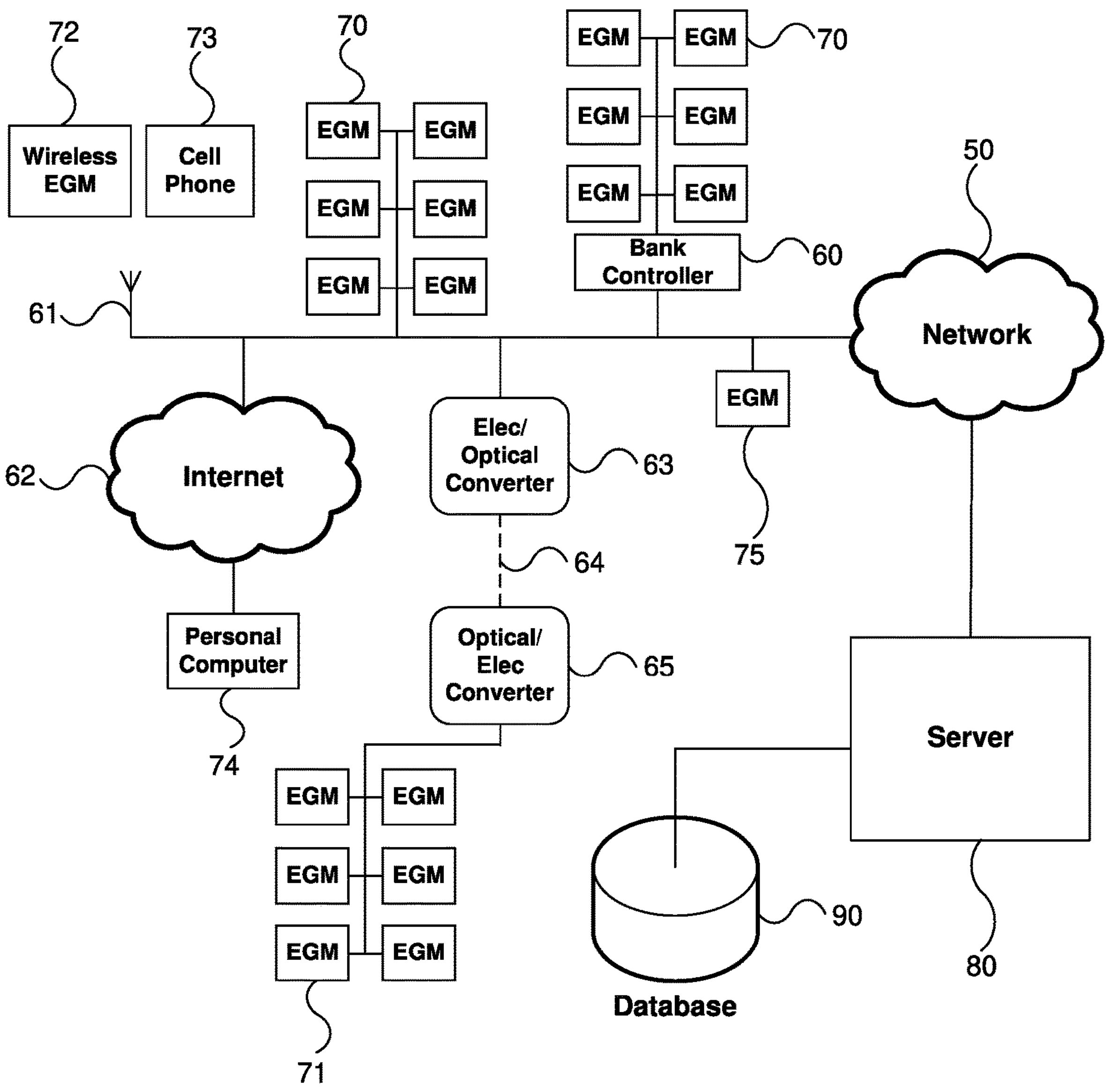
FIG. 3 is a functional block diagram of networked gaming devices according to embodiments of the invention.

FIG. 3 is a block diagram illustrating networked gaming devices according to embodiments of the invention. Referring to FIG. 3, multiple electronic gaming devices (EGMs) 70, 71, 72, 73, 74, and 75 may be coupled to one another and coupled to a remote server 80 through a network 50. For ease of understanding, gaming devices or EGMs 70, 71, 72, 73, 74, and 75 are generically referred to as EGMs 70-75. The term EGMs 70-75, however, may refer to any combination of one or more of EGMs 70, 71, 72, 73, 74, and 75. Additionally, the gaming server 80 may be coupled to one or more gaming databases 90. These gaming network 50 connections may allow multiple gaming devices 70-75 to remain in communication with one another during particular gaming modes such as tournament play or remote head-to-head play. Although some of the gaming devices 70-75 coupled on the gaming network 50 may resemble the gaming devices 10, 10A, 10B, and 10C shown in FIGS. 1A-1B and 2A-2C, other coupled gaming devices 70-75 may include differently configured gaming devices. For example, the gaming devices 70-75 may include traditional slot machines 75 directly coupled to the network 50, banks of gaming devices 70 coupled to the network 50, banks of gaming devices 70 coupled to the network through a bank controller 60, wireless handheld gaming machines 72 and cell phones 73 coupled to the gaming network 50 through one or more wireless routers or antennas 61, personal computers 74 coupled to the network 50 through the internet 62, and banks of gaming devices 71 coupled to the network through one or more optical connection lines 64. Additionally, some of the traditional gaming devices 70, 71, and 75 may include electronic gaming tables, multi-station gaming devices, or electronic components operating in conjunction with non-gaming components, such as automatic card readers, chip readers, and chip counters, for example.

Gaming devices 71 coupled over an optical line 64 may be remote gaming devices in a different location or casino. The optical line 64 may be coupled to the gaming network 50 through an electronic to optical signal converter 63 and may be coupled to the gaming devices 71 through an optical to electronic signal converter 65. The banks of gaming devices 70 coupled to the network 50 may be coupled through a bank controller 60 for compatibility purposes, for local organization and control, or for signal buffering purposes. The network 50 may include serial or parallel signal transmission lines and carry data in accordance with data transfer protocols such as Ethernet transmission lines, Rs-232 lines, firewire lines, USB lines, or other communication protocols. Although not shown in FIG. 3, substantially the entire network 50 may be made of fiber optic lines or may be a wireless network utilizing a wireless protocol such as IEEE 802.11 a, b, g, or n, Zigbee, RF protocols, optical transmission, near-field transmission, or the like.

As mentioned above, each gaming device 70-75 may have an individual processor 40 (FIG. 1A) and memory 41 to run and control game play on the gaming device 70-75, or some of the gaming devices 70-75 may be terminals that are run by a remote server 80 in a server based gaming environment. Server based gaming environments may be advantageous to casinos by allowing fast downloading of particular game types or themes based on casino preference or player selection. Additionally, tournament based games, linked games, and certain game types, such as BINGO or keno may benefit from at least some server 80 based control.

Thus, in some embodiments, the network 50, server 80, and database 90 may be dedicated to communications regarding specific game or tournament play. In other embodiments, however, the network 50, server 80, and database 90 may be part of a player tracking network. For player tracking capabilities, when a player inserts a player tracking card in the card reader 46 (FIG. 1A), the player tracking unit 45 sends player identification information obtained on the card reader 46 through the MCI 42 over the network 50 to the player tracking server 80, where the player identification information is compared to player information records in the player database 90 to provide the player with information regarding their player account or other features at the gaming device 10 where the player is wagering. Additionally, multiple databases 90 and/or servers 80 may be present and coupled to one or more networks 50 to provide a variety of gaming services, such as both game/tournament data and player tracking data.

The various systems described with reference to FIGS. 1-3 can be used in a number of ways. For instance, the systems can be used to track data about various players. The tracked data can be used by the casino to provide additional benefits to players, such as extra bonuses or extra benefits such as bonus games and other benefits as described above. These added benefits further entice the players to play at the casino that provides the benefits.

Figure 4:
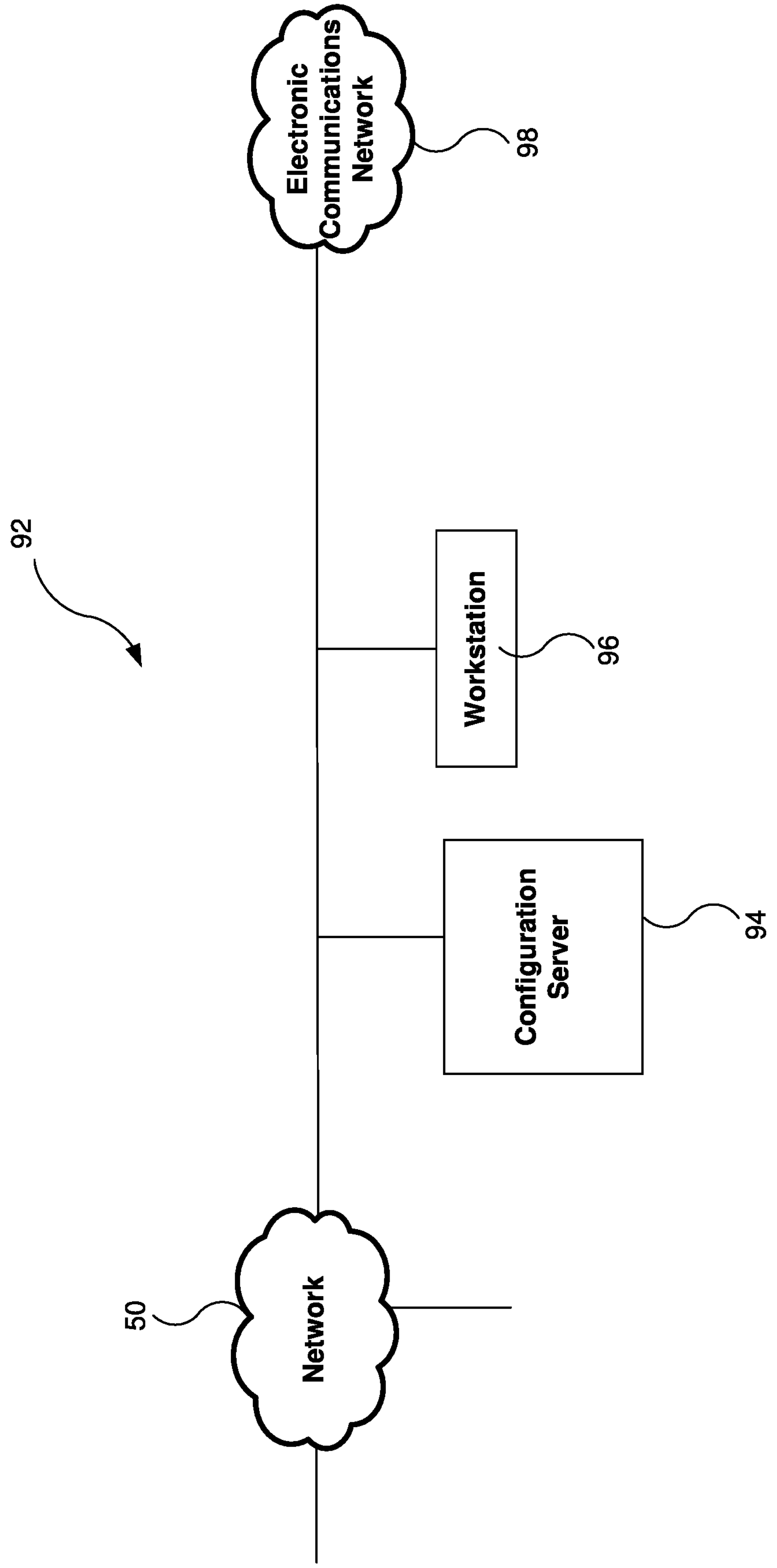
FIG. 4 is a functional block diagram showing an additional portion of the network of FIG. 3.

Indicated generally at 92 in FIG. 4 is another portion of network 50. It includes a configuration server 94 and a workstation 96, both of which are operatively connected for communication with other elements on the network. Network 50 is also operatively connected to at least one electronics communications network 98. Network 98 comprises or may be connected to a cellular network for sending text and voice messages, a telephone network for sending voice messages, and/or a global communications network such as the Internet for sending email messages or posting messages, such as banner ads, to websites.

The configuration server 94 includes a memory having a computer program for processing data that is also stored in the memory. Workstation 96 may be used by casino personnel to enter data that can be stored in memories connected to the network, including the memory in configuration server 94, and to issue commands on the network.

Among other things, the memory associated with server 94 may store a budget, or a process for calculating a budget, for at least a portion of the casino operating expenses and projected revenues. Such a budget typically includes amounts allocated to the cost and numbers of staff for providing gaming and ancillary services provided on the casino floor and to advertising for the casino. The advertising budget may be subdivided to include Internet advertising, which may include banner ads on websites and direct emailing; advertising on broadcast radio and television as well as on cable and satellite providers; print media; and phone advertising, including delivery by voice and text on telephone and cellular networks.

In addition to budget items allocated to advertising, portions of the budget related to marketing may also be included. Such marketing promotions may include complementary amenities provided to selected players as well as promotions to induce players to come to the casino. Such marketing promotions may be tiered to provide incentives that are roughly proportional to the amount of wagering that may be expected from a particular player or a particular class of players.

The computer program in the memory of server 94 implements an artificial intelligence (AI) process. The program may be of several different types, e.g., search and optimization. This approach searches for a solution among a number of possibilities or takes a base solution and optimizes it until it cannot be improved. It may include evolutionary computation in which solutions over several generations are evolved. Another AI approach that could implement the present method includes logical models, such as propositional or sentential logic, first-order logic, and fuzzy logic. Probabilistic methods are other AI approaches that are suitable for the present method. These include Bayesian networks, Markov models, Kalman filters, decision theory, game theory, and utility theory. Still further approaches include classifiers and statistical learning models, neural networks, and control theory. A person having ordinary skill in the art could use any of these kinds of programs to implement the preferred embodiment as described herein.

In addition to the computer program and the budget, server 94 receives and monitors a number of performance variables that indicate how well the casino is performing. It should be appreciated that there may be different kinds of casino performance. An obvious one, of course, is casino profitability. But that is not necessarily always the single objective. For example, a casino may want to develop market share at the expense of profitability, at least for a while.

Other performance objectives may also be targeted.

The performance variables may include accounting data gathered from network 50 and information gathered from the player-tracking system on the network, both of which can be contrasted against the budget data stored in the memory associated with server 94. A dedicated accounting server (not shown) may receive information on the network from all of the gaming machines concerning amounts wagered, jackpots paid, and other accounting data. This accounting information, or some portion of it, may in turn be provided to server 94.

In addition to the performance variables, server 94 is provided with data that includes information about local weather; local traffic; transportation costs, including information about the price of gas, plane tickets, and rental cars; competitors' activities, including promotions, activities and other inducements offered by direct competitors as well as competition from other types of entertainment, such as musical and theatrical performances; cost of advertising via, e.g., website banners, print media, broadcast media, etc.; and time, day, date, month, and timing of holidays. These types of factors are referred to herein as environmental factors.

Many of these environmental variables are now available as electronic data from electronic communications network 98, including the Internet. Others may be entered manually by casino personnel via workstation 96. Still others, such as the time, may be provided from other sources.

As discussed above, the casino can exercise control over a number of variables that affect casino performance. And many of these variables are associated with elements that reside on and/or may be controlled by network 50. For example, the player-tracking system may be located on server 80 or on an independent server (not shown) connected to network 50. The player tracking system provides incentives to wager, much like airline frequent-flier programs provide incentives to fly. Player-tracking incentives may be added or modified, by reducing or enhancing incentives, as a result of a command sent over network 50 to either the player-tracking server or to one or more of gaming machines 70.

Concerning complementary amenities ("comps"), some casinos use customer relationship databases (not shown), which is also on network 50. It may include contact information such as mailing address, with zip code, and phone and email contact information. This database tracks the level of play and other information about customers and potential customers. It typically indicates what kinds of comps, such as free meals, drinks, rooms, shows, etc., each tracked customer may be entitled to. As with the player-tracking system, commands over network 50 from server 94 may add or modify, by reducing or enhancing, comps associated with a particular player or with a class of players. The customer relationship databases receive information from a variety of sources, including over the network in the form of accounting data related to wagers placed. This information enables the casino to consider individual players, or an aggregate group of players with a least one common attribute, in accordance with their potential or estimated net worth, which is often useful to the casino.

In other words, the casino can infer how much money a player or group of players is likely to spend n the future. Worth is traditionally estimated by reviewing a player's past play records and projecting future potential. Such a projection is not possible when the player's past performance records are unavailable or the player's past performance has been limited. For example, a player might have a significant capacity to spend and even a propensity to gamble. But if that player felt mistreated, believed the cost of gambling was too expensive, gambled at another location, was not tracked in prior play at a given location or simply did not like—or did not understand—an offering, his play history would not accurately reflect his worth.

The first element of worth valuation is capacity to spend. Does a given player, or group of players, have funds with which to gamble and, if so, how much do they have? When this measure is known, management can decide what incentives to potentially offer. For example, a player with capacity to spend $2,000/month is a very valuable player. But a casino could not afford to charter a jet to fly him cross-country, nor could it put him up in a $3,000/night suite. The casino could offer a free standard room, dinner for two in the steak house and free tickets to a concert. For reasons just described, the player's capacity to spend has great influence on incentives and rewards that can be profitably offered to him.

The second element of worth valuation is propensity to gamble. Many people have significant available financial funds but have no desire to gamble. In these cases, management may offer significant benefits—possibly including a charted jet—because if the player rejects the offer, the casino has only spent the cost of making the offer. In these cases, the magnitude of offer may be a secondary consideration to the cost of marketing and communicating the offer.

Both capacity to spend and propensity to spend may be determined by historical performance, as described earlier, or by projection. This last technique uses known attributes (besides historic play) to project a player's characteristics. For example, a person living in an affluent neighborhood, as determined by physical address, could imply having a significant capacity to spend. Management could turn to a free website, such as Zillow.com, to determine specific worth of the home or it could turn to fee-based services such as credit checks, credit card ratings, etc. for information on which to base a projection. This is one of the sources of information on which the present implementation of the method could rely.

The same home address information could be used to assess propensity to gamble. If the person lives in a neighborhood with other known gamblers, he is more likely to be a gambler too. Similarly, the person's name could be compared against public records of slot tournaments, golf tournaments, participants in World Series of Poker, membership in Internet gambling sites, etc. to better gauge propensity to gamble.

The above is simply a brief description of determining a player's potential worth. The Internet, available mailing lists, housing records and other such databases of information, combined with personal referrals and other information sources are all useful in determining player worth.

When such information is made part of the automated configuration decisions accomplished by the implementation of the present method, the efficiency and efficacy of casino operations are vastly improved.

A bonus is an award to a player that is beyond what the game played by the player is required to pay according to the game's paytable. These are often delivered via network 50 to the player's gaming machine and may include credits for game play, double jackpots, random awards, and other bonuses. Commands from configuration server 94 may be issued over network 50 to the bonus server to affect the amount and frequency of bonus awards.

The characteristics of the games themselves, including both electronic gaming machines and table games, are important in determining casino performance. These characteristics can include some aspects that can be implemented and/or changed over network 50 and other aspects that cannot be. Game features that might be changed by network commands include payback percentage and game speed. Other characteristics, such as the type of game and whether that game or another game should be on the floor, game location, and game denomination may require human intervention to, e.g., change the location of a game on the floor or change a rule of a table game. As will be seen, however, configuration server 94 may be helpful in determining when and how to change operating parameters that require human intervention to optimize casino performance.

Additional operating parameters that may be influenced by network 50 include advertising and promotions. As will be described in more detail, configuration server 94 may determine that a particular kind of advertising should be increased, decreased, or redirected. If so, an electronic message such as an email or text message can be generated by server 94 and transmitted via electronic communications network 96. It may be transmitted to an advertising agency with an instruction to modify the current advertising or it may be transmitted directly to broadcasters and/or publishers with instructions concerning further placement of ads.

Similarly, in response to a command by server 92 a promotional email, letter, or text message may be delivered via network 98. In the case of a letter, an electronic message could go to direct-mailing concern or other entity charged with sending promotional letters to initiate a mailing or place an Internet ad or series of ads. In any event, the promotional communication could contain information about an incentive for a potential player to come to the casino and play its gaming devices. Such an incentive might include, e.g., free credits usable only to make wagers on machines connected to network 50. A promotional code might be required to be entered, e.g., by the player via the player tracking system to permit the programmed configuration server to evaluate the effectiveness of various promotions.

Implementation of these bonuses is accomplished by broadcasting corresponding instructions to the casino floor and the player tracking or bonus servers. For example, a promotion saying that all players are eligible for doubled payments on any jackpot won of $100 or above during the next 24 hours is described in an email blast to known players and in an electronic billboard along a busy freeway. Additionally, newspaper ads carry the same message. Within each message is a code, for example "12369." The code varies according to the ad in which it is run. To be eligible for the bonus, a player must enter the code into the player tracking unit 45 before inserting money into the game. The casino floor is configured to recognize this code and activate the doubled bonus opportunity.

The system tracks all codes entered and the amount of play generated by players using each code. It then automatically compares the value of each group's response to the cost of the advertisement. The advertising venues and formats that return a profitable response are increased while the less profitable ones are decreased or eliminated. The system thus learns which advertising is most effective. It may, however, continue to run small tests on the lower-performing mediums to see if they eventually become more effective.

All sorts of promotions are possible in addition to doubled jackpots. For example, by entering the proper code, a game outcome of BAR BAR BLANK could become a winning outcome even though it otherwise is not. Also, the player may enter his code through the game itself and not the player tracking system. Or the player could enter the code from his cell phone through the Internet and specify which game he is currently playing. In some cases a code could be entered only when the promoted event occurs. A prerequisite could be the use of a player tracking card.

Figure 5:
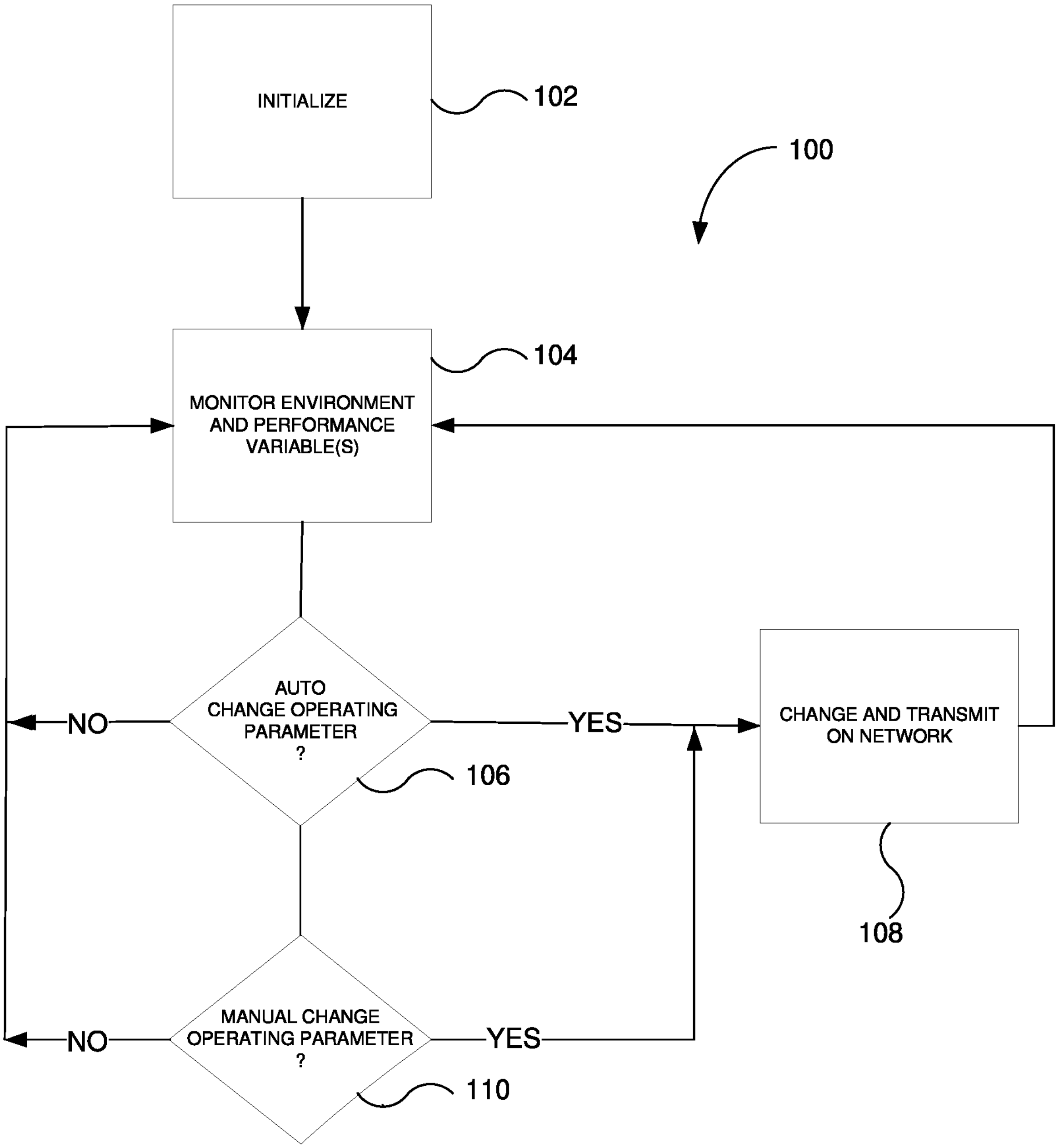
FIG. 5 is a flow chart depicting operation of an embodiment of the invention.

Turning now to FIG. 5, indicated generally at 100 is a flow chart that depicts the operation of the AI program associated with server 94. To begin, operating parameters are set to an initial value at 102. These operating parameters include those things, some of which are discussed above, over which the casino can exert control, e.g., game configuration and location, player-loyalty program, comps, promotions, bonuses, staffing levels, advertising, etc. These initial parameters may be set by the managers of the casino where network 50 is implemented, and may be based on their training and experience in connection with managing a casino toward a performance goal.

After so setting the initial parameters at 102, the environment variables and the performance variables are monitored at 104 as described above. Examples of the environmental factors include weather, traffic, transportation cost, time, and cost of advertising. Examples of performance variables may be derived from the accounting data and may include gross revenues or revenues related to specific aspects of casino operations or calculations based on the budget stored in the memory associated with server 92 to determine such things as overall profitability or profitability of specific aspects of casino operations, etc. Alternatively, performance variables could be derived from the player-tracking system and may include total tracked players or tracked players playing a particular type or class of games. Still another performance variable might be the total number of games being played, regardless of whether each player is tracked, or the total number—tracked and untracked—of a particular type or class of games being played. Any performance goal that can be derived from data on the network can comprise a performance variable according to the present method.

After monitoring has begun at 104 the AI program makes a determination concerning whether or not to change one of the operating parameters at 106. The decision concerning whether to change—and, if so, by how much—may be based on several factors. First, different operating parameters require different lengths of time after implementation or changing to determine what, if any, effect the change makes. For example, initiating a round of double jackpots or random bonuses might have an almost immediate effect as those in the casino observe celebrations, by the gaming machines as well as by the players, resulting from an increase in bonus payments over and above the pay tables. Whether this effect tends to drive the system toward or away from the performance objective must then be considered. But it can be considered fairly quickly after the bonus is implemented or changed.

On the other hand, some operating parameters require a longer time period to determine their affect on the performance goal. For example, advertising in print media might not even be published for several days or longer, and a single publication may not make an impact on the performance goal. As a result, the determination concerning whether to change an operating parameter at 106 will be delayed by different times for different parameters.

Some promotions may take longer to evaluate than others. Perhaps an initial response to a double jackpot offer is very strong but falls off after two weeks of use. A second promotion offering a payment on BAR BAR BLANK outcomes is then instituted in place of doubled jackpots, thus causing revenues to rise again. The system tracks long-term effectiveness. If response is building, the system may retain a promotion, or even amplify it, in the belief that player response will eventually rise enough to justify its costs. In the case of declining response, the system may substitute alternate promotions, as just described, and test different periods between alternations. The system may learn, for example, that rotating between five different promotions is effective. It may learn that promotion A is good for 10 days, promotion B is good for 7, etc. As the system learns, it remembers and uses that information as a starting point for the next promotional cycle. However, just as with direct marketing, the system regularly tests new ideas, or even ideas that had worked in the past, or even ideas that never worked, to see if the market's appetite has changed. Retaining a benchmark of performance and constantly testing new promotions and configurations is vital to finding the most effective combinations and configurations for current times. Also, promotions may only be offered to certain player segments or audiences. Some promotions might go to known loyal players, while others are available to known players, i.e., anyone in the player-tracking system and still others can include, or even be limited to, unknown players.

In addition to the variations in response times, at least some of the parameters will have defined limits beyond which the AI program cannot change them. This prevents a single parameter from being driven to an extreme that might tend to achieve the performance goal, but might be objectionable for one reason or another. When a performance variable is set at a limit, the AI program will continue adjusting other variables in a manner that tends to optimize at least one of the performance variables.

If the AI program decides to make a change to the operating parameter at 106, the parameter is changed at 108 by sending a network command from configuration server 94 and monitoring continues at 104.

Even if there is no change to the performance variable under consideration at 106, monitoring continues at 104. In addition, casino personnel may enter a manual change at 108 via workstation 96. This enables the casino to control a performance variable for reasons that may, at least temporarily, supersede a longer term goal of achieving the performance objective. In addition, the casino has the opportunity at 108 to set at least some of the operating parameters beyond the limits contained in the AI program. As just mentioned, this allows the casino to achieve a shorter term objective, such as generating excitement on the floor by awarding extra bonuses, which might not necessarily align with the performance goal. What is more, setting a single operating parameter outside its limit may result in the AI program determining values for at least one other operating parameter that are helpful in achieving the performance variable and which may ultimately result in resetting the limits for the operating parameter in question. Whether or not there is a manual change at 110, monitoring ultimately continues at 104.

Because the system is constantly receiving information about revenues and expenses, it can calculate or modify the budget or a portion thereof based on current and projected operations.

Consideration will now be given to specific examples of changes made by the present embodiment of the method. The AI program may call for a very specific change in advertising, e.g., relying on, among other things, the information in the customer relationship database to increase a certain type of advertising in a certain zip code. This may result in an email initiated by the AI program to the casino advertising manager to that effect. The advertising manager can proceed to place the ad(s) in a conventional manner. Or the email may go direct to an ad agency or the entity that will carry the ad.

Some entities could have a set of pre-existing orders, such as "place banner ad abc on website xyz for n days." Electronic notification via network 98 by the AI program could easily implement this or any number of similar orders from a library of possible orders. Using the budget stored in configuration server 94, the AI program may determine where to advertise and at what rate.

Some advertising mediums, e.g., Google, allow bidding on ads, such as website banner ads. The system could set the maximum amount bid on a keyword, or set of keywords, and change the bid depending on conditions. The bid can be submitted electronically as described above or could be placed by casino management or its advertising agency in response to a prompt from the system.

Concerning game types and placement, the AI program can generate directions that could be used by casino employees to change out gaming machines, change the placement of gaming machines or implement any other proposed configuration change that cannot be effectively implemented by network 50 or elements connected to the network.

Emails may be automatically directed to those in the customer relationship database and to any other email addresses the casino might have access to. The email could be a simple as "Come in to play tonight." Or it might contain a promotional code that when entered, e.g., via player interface panel 39, entitle the player to free or reduced cost gaming credits. The code enables the system to track its costs and evaluate its effectiveness in achieving the performance goal. In this manner feedback loops among a plurality of variables are created. A parameter is changed and the AI program determines the effect of the change relative to a performance variable. After changing the AI program whether to maintain that change or make further modifications. The system therefore tends to optimize at least one performance variable of the casino.

Some embodiments of the invention have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention is intended to cover alternatives, modifications, and equivalents that come within the scope and spirit of the inventive principles set out in the appended claims.

The invention claimed is:

1. A method comprising:

receiving, by a computing device associated with an artificial intelligence system, from an electronic casino gaming machine at a casino, a gaming session initiation signal;

based on receiving the gaming session initiation signal, determining a first electronic bonus paytable associated with the electronic casino gaming machine;

sending, to one or more environmental factor servers, one or more queries;

receiving, from the one or more environmental factor servers, based on the one or more queries, one or more indications of one or more changes in one or more environmental factors external to the casino;

determining, by the artificial intelligence system, based on the one or more indications of the one or more changes in the one or more environmental factors external to the casino, one or more alternative electronic bonus paytables; and updating, based on the one or more changes in the one or more environmental factors external to the casino, the first electronic bonus paytable to the one or more alternative electronic bonus paytables.

2. The method of claim 1, wherein the gaming session initiation signal is received based on one or more of: receipt of a bill via a bill acceptor or receipt of a wager via user device associated with a user.

3. The method of claim 1, further comprising updating, based on the one or more changes in the one or more environmental factors external the casino, one or more electronic billboards.

4. The method of claim 1, wherein the one or more environmental factors comprise one or more of: local weather, local traffic, transportation costs, a price of gas, a price of plane tickets, a price of rental cars, competitors' activities, competitor promotions, local entertainment, a cost of digital advertising, a cost of print advertising, or a cost of advertising on billboards.

5. The method of claim 1, wherein the one or more alternative electronic bonus paytables comprise one or more of: increased odds of a winning outcome, increased odds of a losing outcome, increased odds of a null outcome, or an increased ratio of a payout amount to a wager amount.

6. The method of claim 1, further comprising outputting, based on the one or more alternative electronic bonus paytables, a bonus award.

7. The method of claim 6, wherein outputting the bonus award comprises one or more of: outputting cash, outputting a receipt, or transferring funds to an account.

8. One or more non-transitory computer readable media storing processor-executable instructions thereon, that, when executed by at least one processor, cause the at least one processor to:

receive, by a computing device associated with an artificial intelligence system, from an electronic casino gaming machine at a casino, a gaming session initiation signal;

based on receiving the gaming session initiation signal, determine a first electronic bonus paytable associated with the electronic casino gaming machine;

send, to one or more environmental factor servers, one or more queries;

receive, from the one or more environmental factor servers, based on the one or more queries, one or more indications of one or more changes in one or more environmental factors external to the casino;

determine, by the artificial intelligence system, based on the one or more indications of the one or more changes in the one or more environmental factors external to the casino, one or more alternative electronic bonus paytables; and update, based on the one or more changes in the one or more environmental factors external to the casino, the first electronic bonus paytable to the one or more alternative electronic bonus paytables.

9. The one or more non-transitory computer readable media of claim 8, wherein the gaming session initiation signal is received based on one or more of: receipt of a bill via a bill acceptor or receipt of a wager via user device associated with a user.

10. The one or more non-transitory computer readable media of claim 8, wherein the processor-executable instructions, when executed by the at least one processor, further cause the at least one processor to update, based on the one or more changes in the one or more environmental factors external to the casino, one or more electronic billboards.

11. The one or more non-transitory computer readable media of claim 8, wherein the one or more environmental factors comprise one or more of: local weather, local traffic, transportation costs, a price of gas, a price of plane tickets, a price of rental cars, competitors' activities, competitor promotions, local entertainment, a cost of digital advertising, a cost of print advertising, or a cost of advertising on billboards.

12. The one or more non-transitory computer readable media of claim 8, wherein the one or more alternative electronic bonus paytables, comprise one or more of: increased odds of a winning outcome, increased odds of a losing outcome, increased odds of a null outcome, or an increased ratio of a payout amount to a wager amount.

13. The one or more non-transitory computer readable media of claim 8, wherein the processor-executable instructions, when executed by the at least one processor, further cause the at least one processor to output, based on the one or more alternative electronic bonus paytables, a bonus award.

14. The one or more non-transitory computer readable media of claim 13, wherein the processor-executable instructions that, when executed by the at least one processor, cause the at least one processor to output the bonus award, further cause the at least one processor to cause the electronic casino gaming machine one or more of: output cash, output a receipt, or transfer funds to an account.

15. An apparatus comprising:

one or more processors; and memory storing processor-executable instructions that, when executed by the one or more processors, cause the apparatus to:

receive, by a the apparatus, from an electronic casino gaming machine at a casino, a gaming session initiation signal, wherein the electronic casino gaming machine is associated with an artificial intelligence system;

based on receiving the gaming session initiation signal, determine a first electronic bonus paytable associated with the electronic casino gaming machine;

send, to one or more environmental factor servers, one or more queries;

receive, from the one or more environmental factor servers, based on the one or more queries, one or more indications of one or more changes in one or more environmental factors external to the casino;

determine, by the artificial intelligence system, based on the one or more indications of the one or more changes in the one or more environmental factors external to the casino, one or more alternative electronic bonus paytables; and update, based on the one or more changes in the one or more environmental factors external to the casino, the first electronic bonus paytable to the one or more alternative electronic bonus paytables.

16. The apparatus of claim 15, wherein the gaming session initiation signal is received based on one or more of: receipt of a bill via a bill acceptor or receipt of a wager via user device associated with a user.

17. The apparatus of claim 15, wherein the processor-executable instructions, when executed by the one or more processors, further cause the one or more processors to update, based on the one or more changes in the one or more environmental factors external to the casino, one or more electronic billboards.

18. The apparatus of claim 15, wherein the one or more environmental factors comprise one or more of: local weather, local traffic, transportation costs, a price of gas, a price of plane tickets, a price of a rental car, competitors' activities, competitor promotions, local entertainment, a cost of digital advertising, a cost of print advertising, or a cost of advertising on billboards.

19. The apparatus of claim 15, wherein the one or more alternative electronic bonus paytables comprise one or more of: increased odds of a winning outcome, increased odds of a losing outcome, increased odds of a null outcome, or an increased ratio of a payout amount to a wager amount.

20. The apparatus of claim 19, wherein the processor-executable instructions, when executed by the one or more processors, further cause the apparatus to cause the electronic casino gaming machine to output, based on the one or more alternative electronic bonus paytables, a bonus award.

* * * * *